Feb. 16, 1971  J. B. WHITEHOUSE ET AL  3,563,000
PACKAGING APPARATUS
Filed Nov. 28, 1967  17 Sheets-Sheet 3
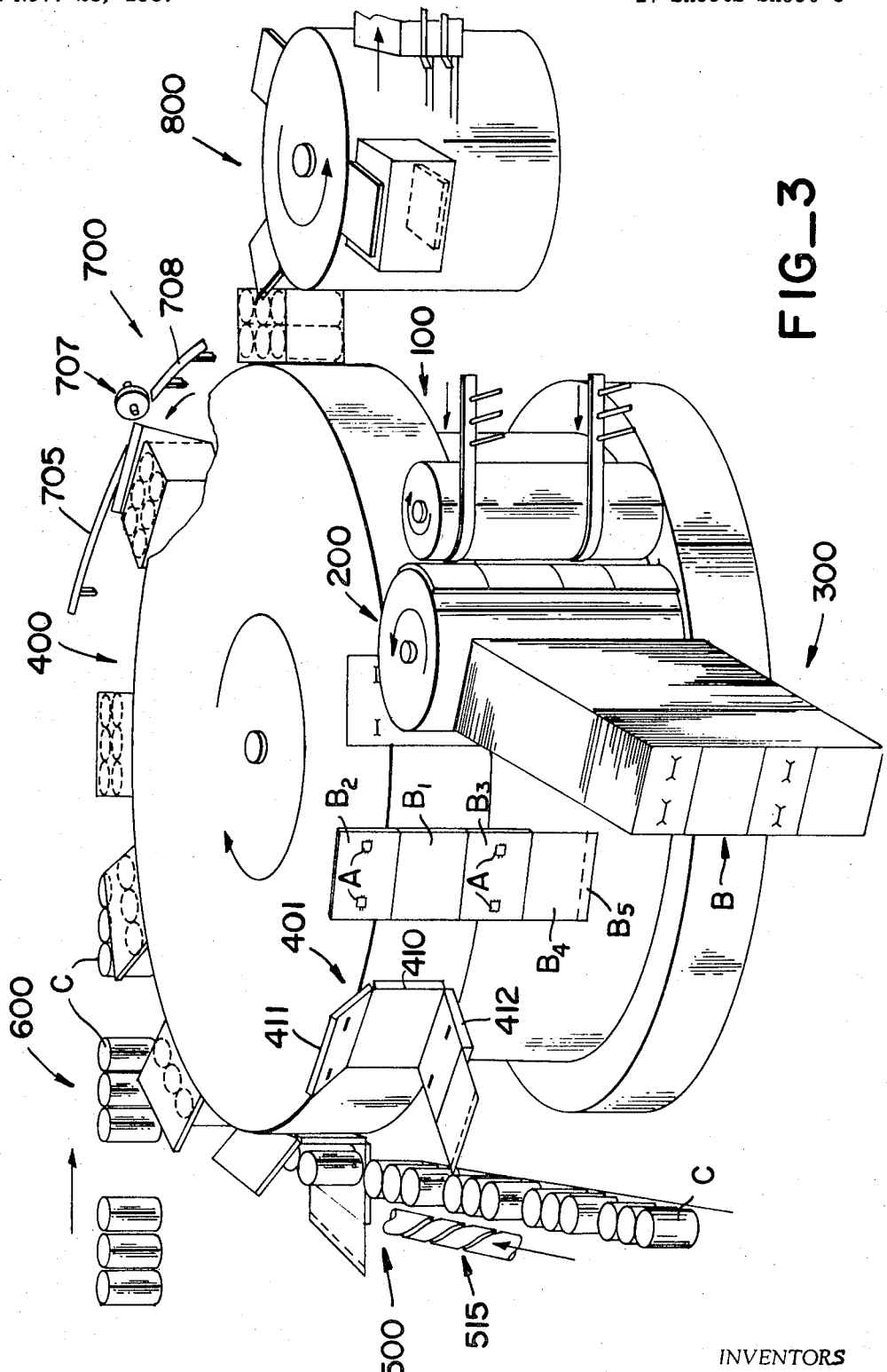
FIG_3
INVENTORS
JOHN B. WHITEHOUSE
GUNNAR G. B. ALHORN
BY
ATTORNEYS

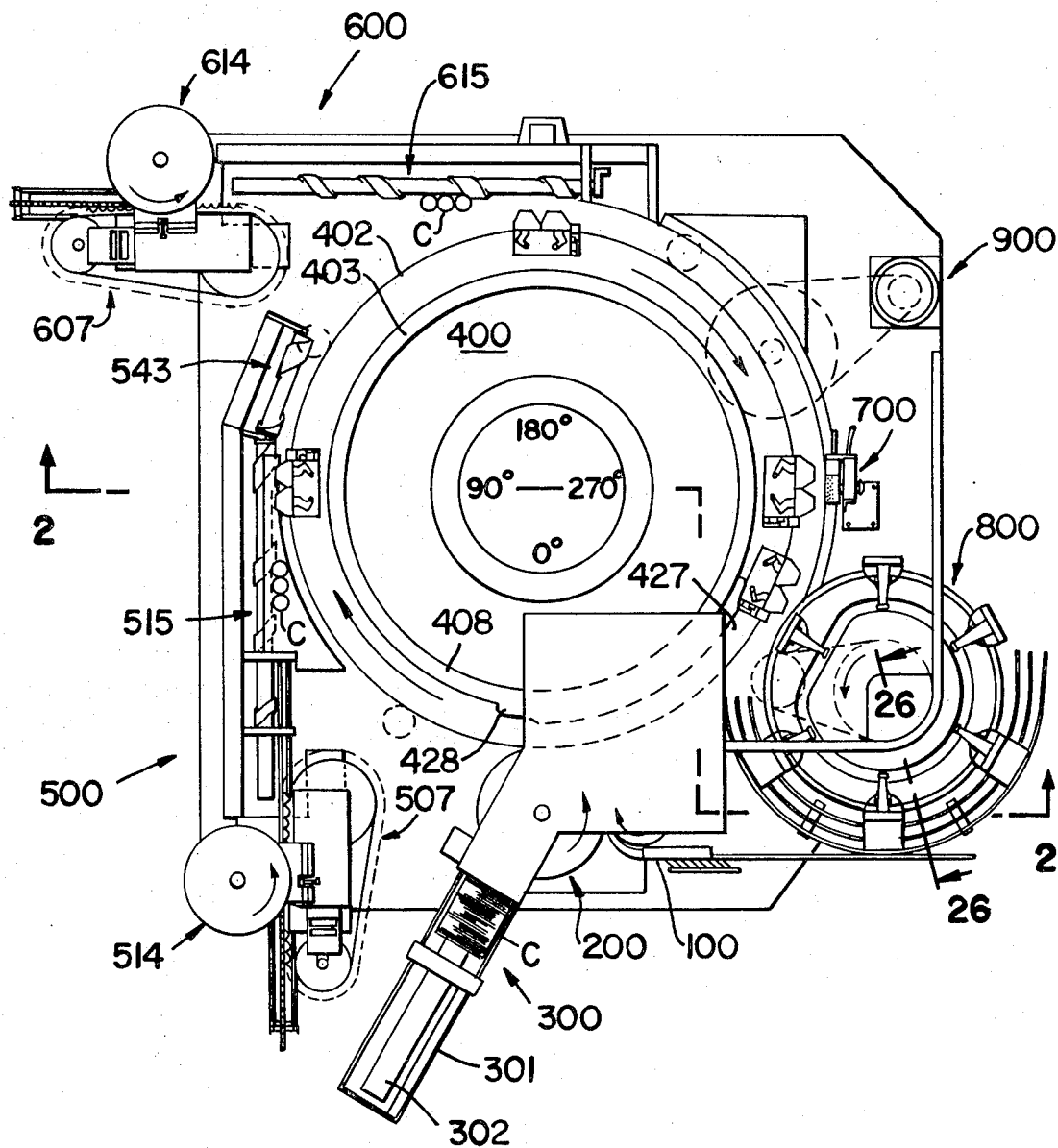
FIG_1

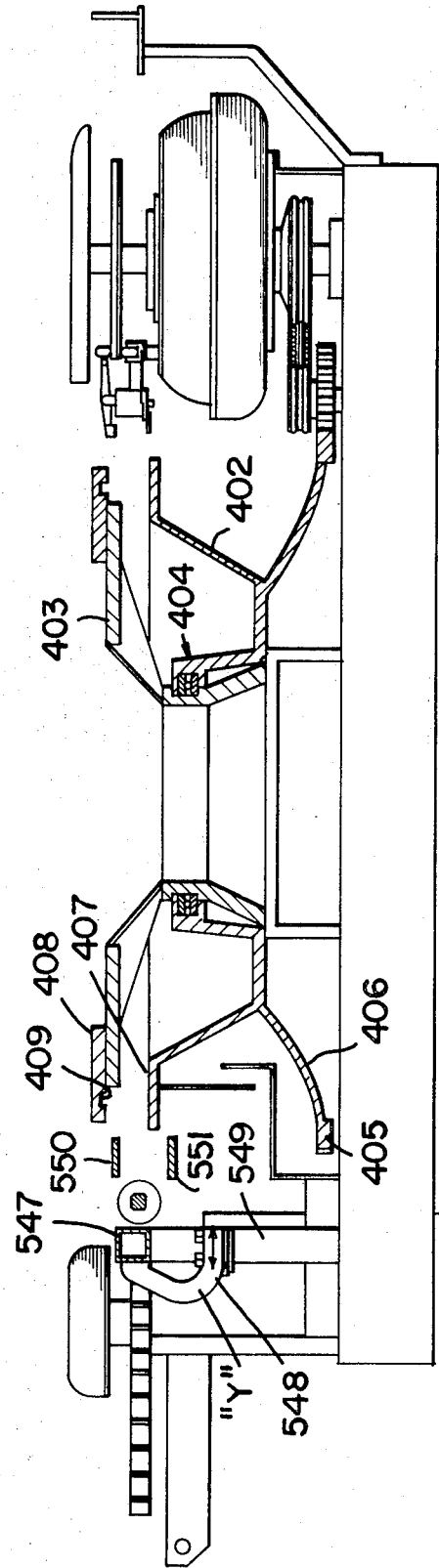

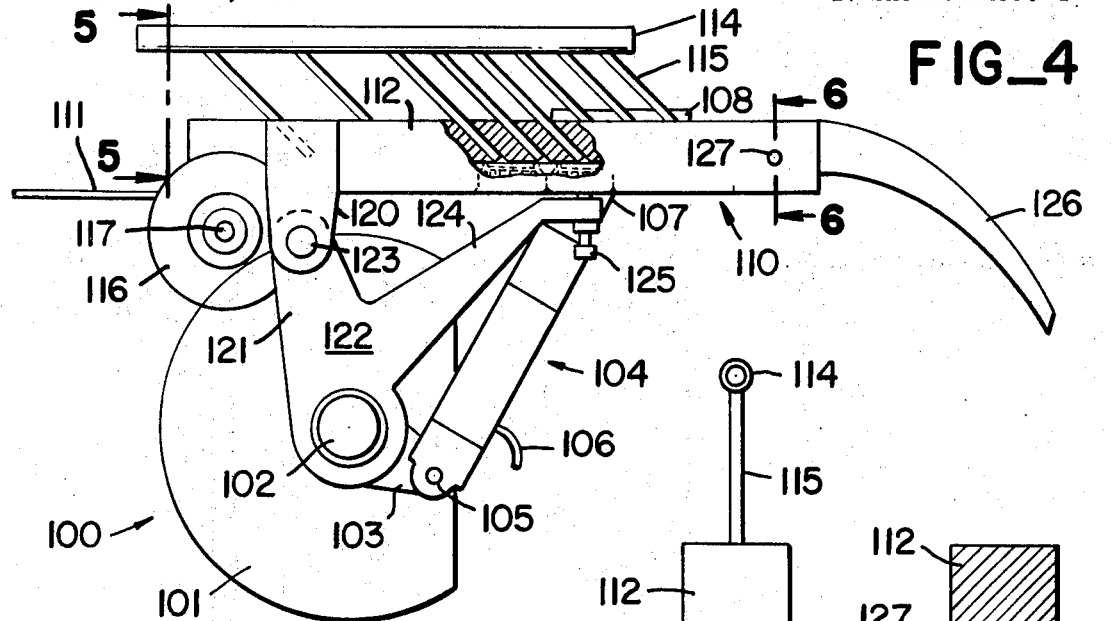
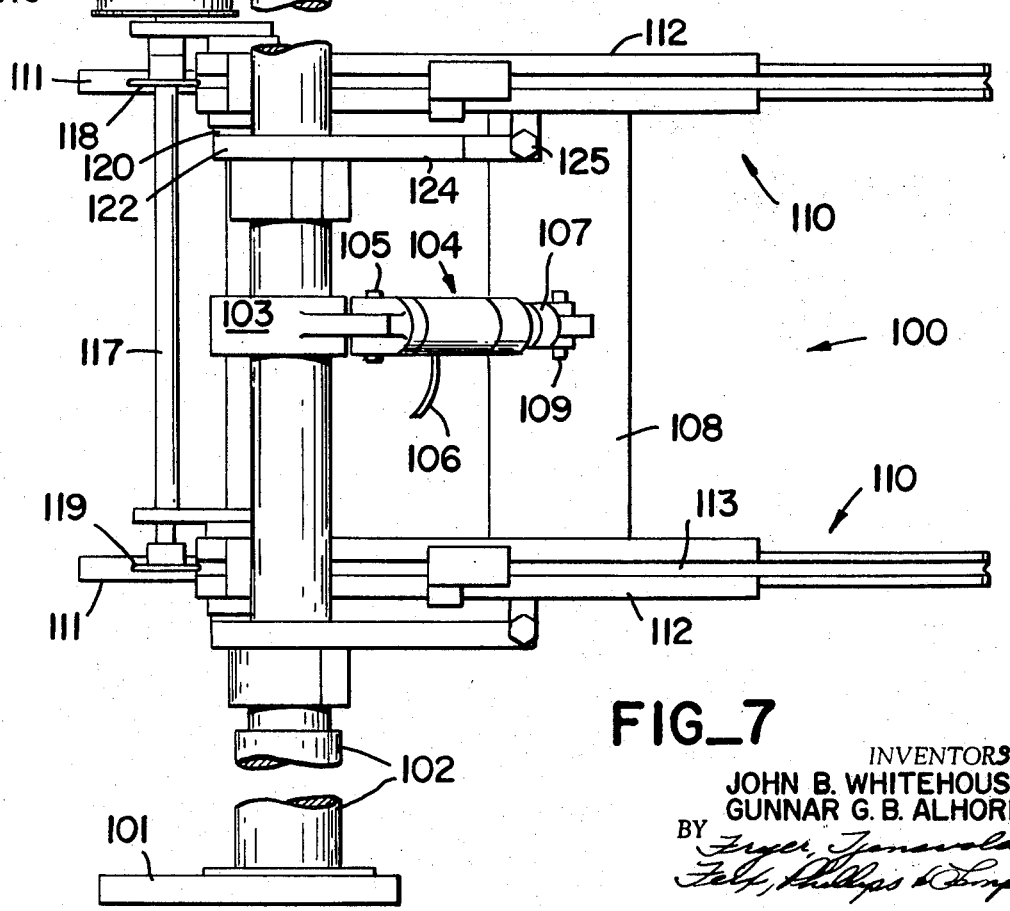

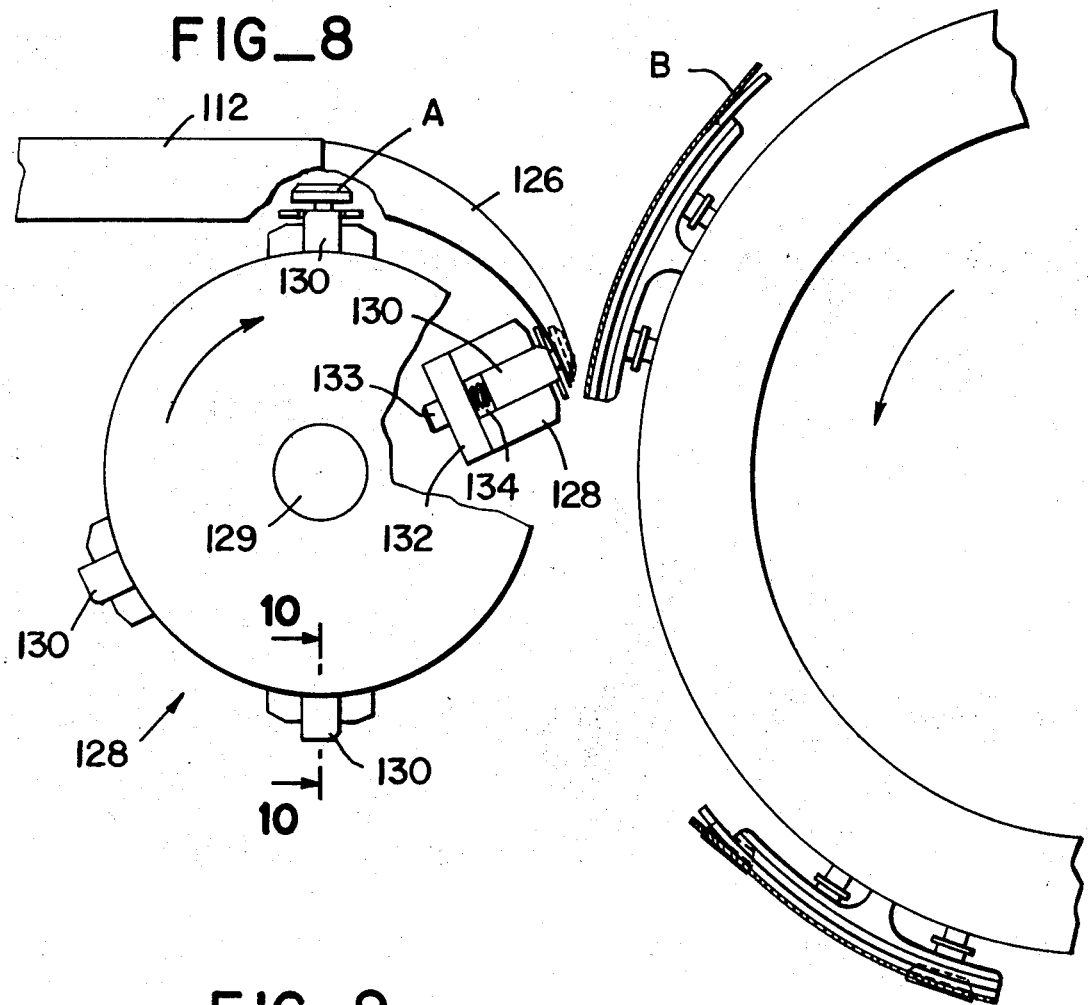
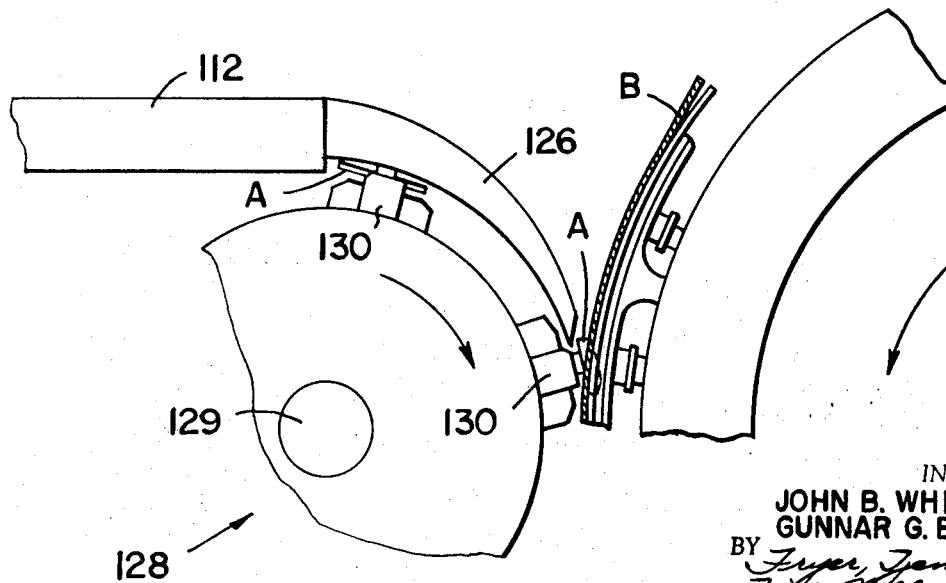

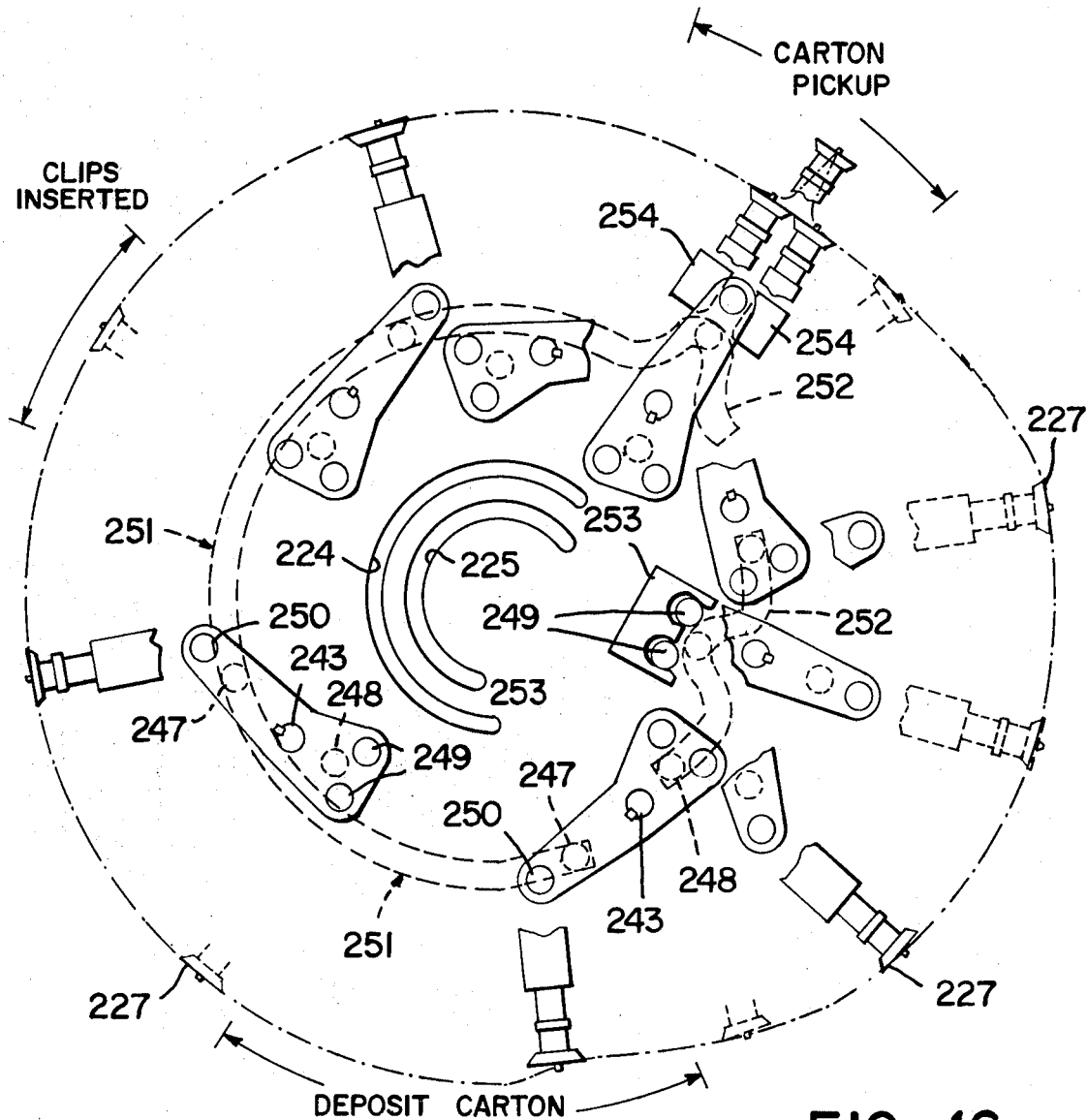
FIG_16
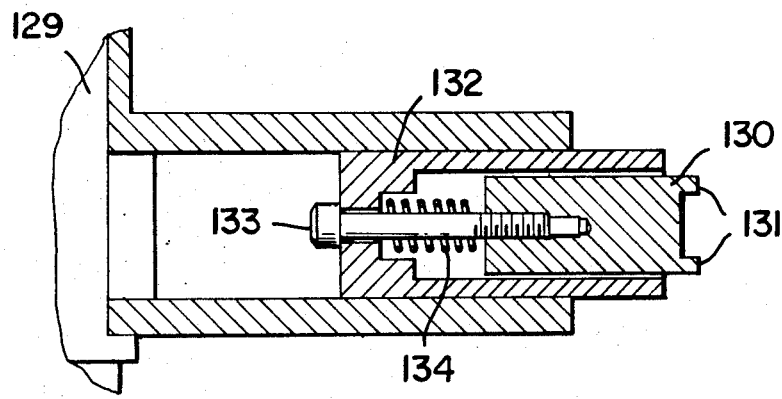
FIG_10

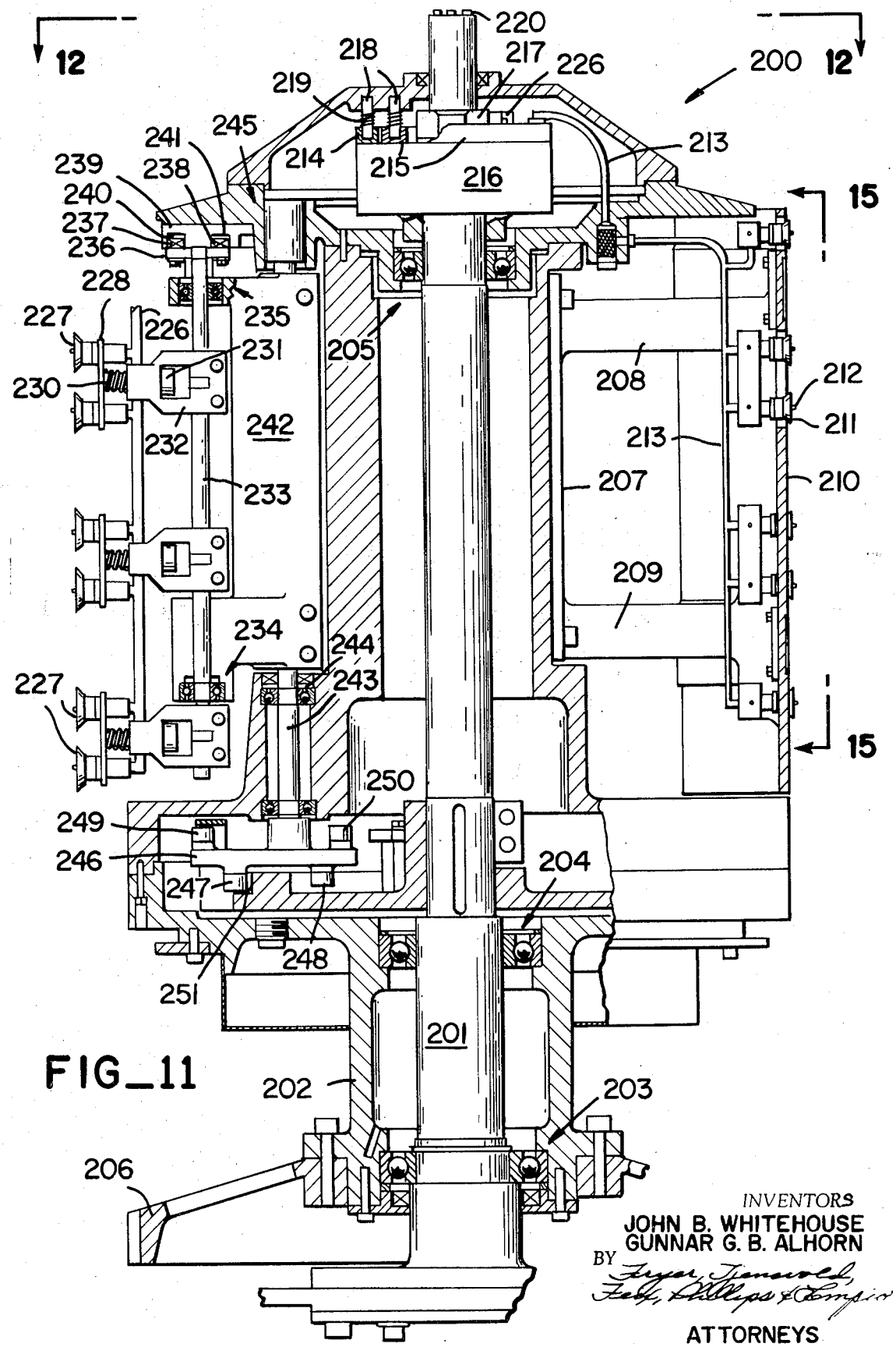

Feb. 16, 1971  J. B. WHITEHOUSE ET AL  3,563,000
PACKAGING APPARATUS
Filed Nov. 28, 1967  17 Sheets-Sheet 8
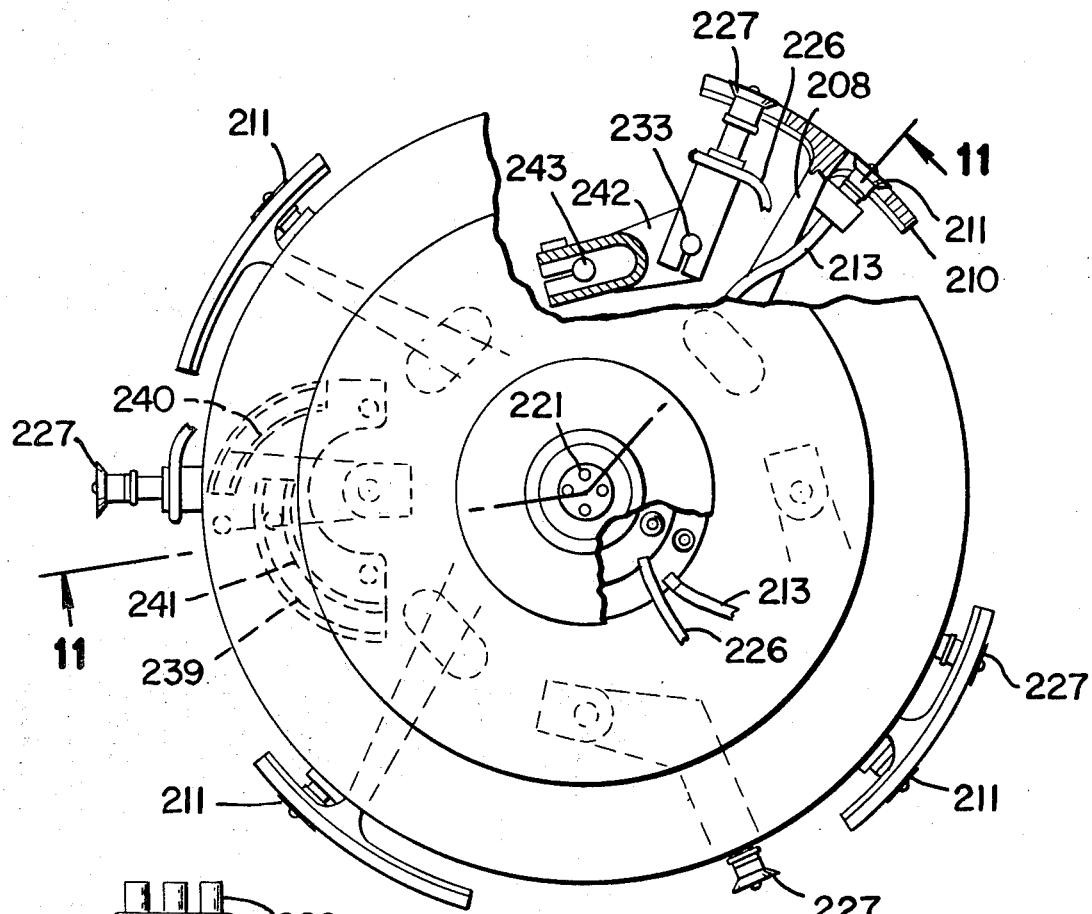
FIG_12
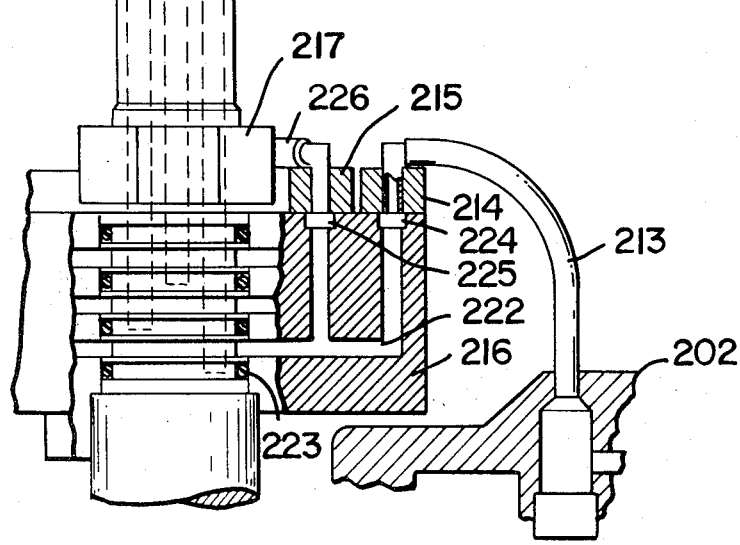
FIG_13
INVENTORS
JOHN B. WHITEHOUSE
GUNNAR G. B. ALHORN
BY
ATTORNEYS

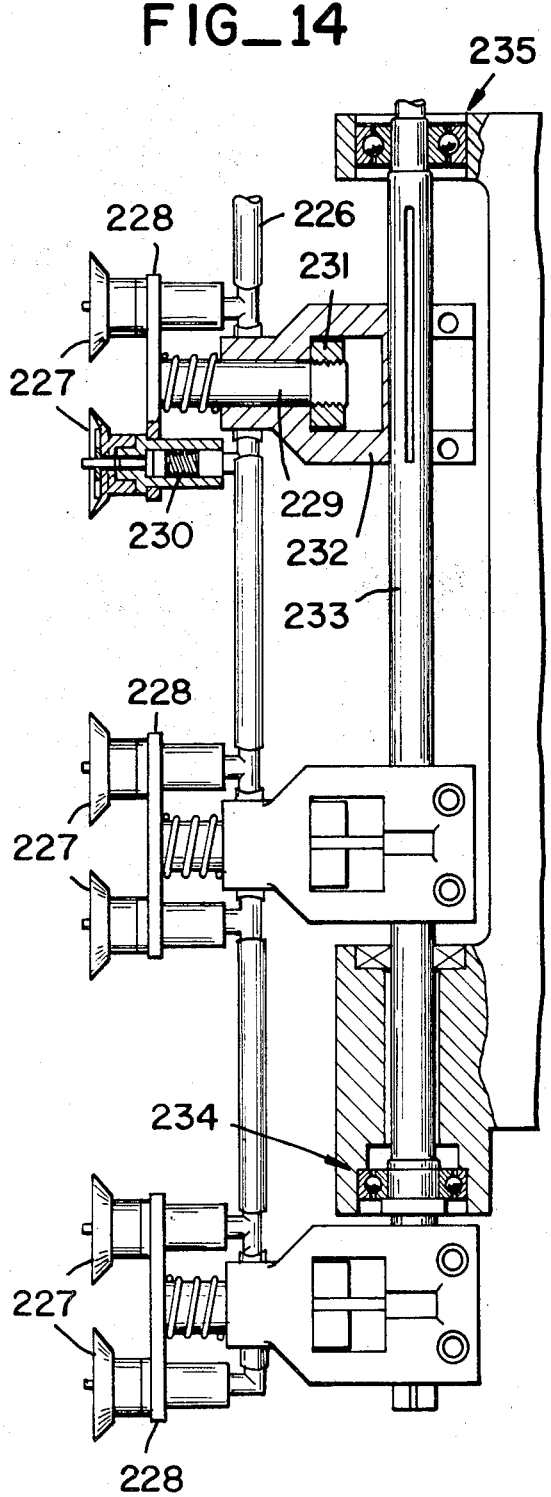
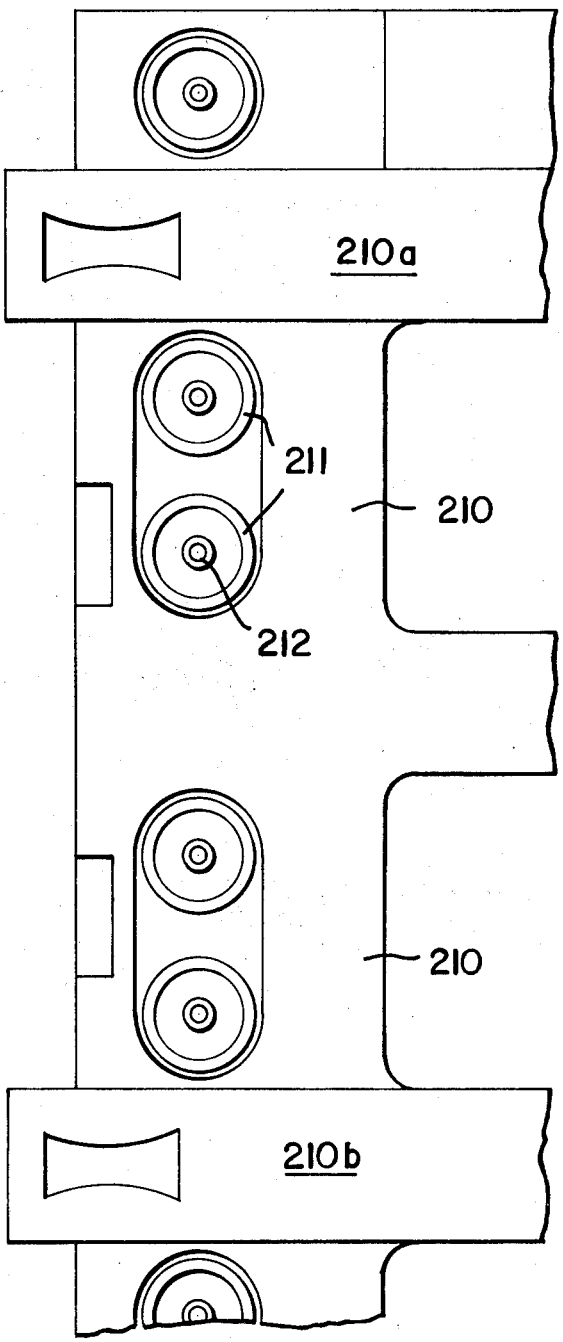

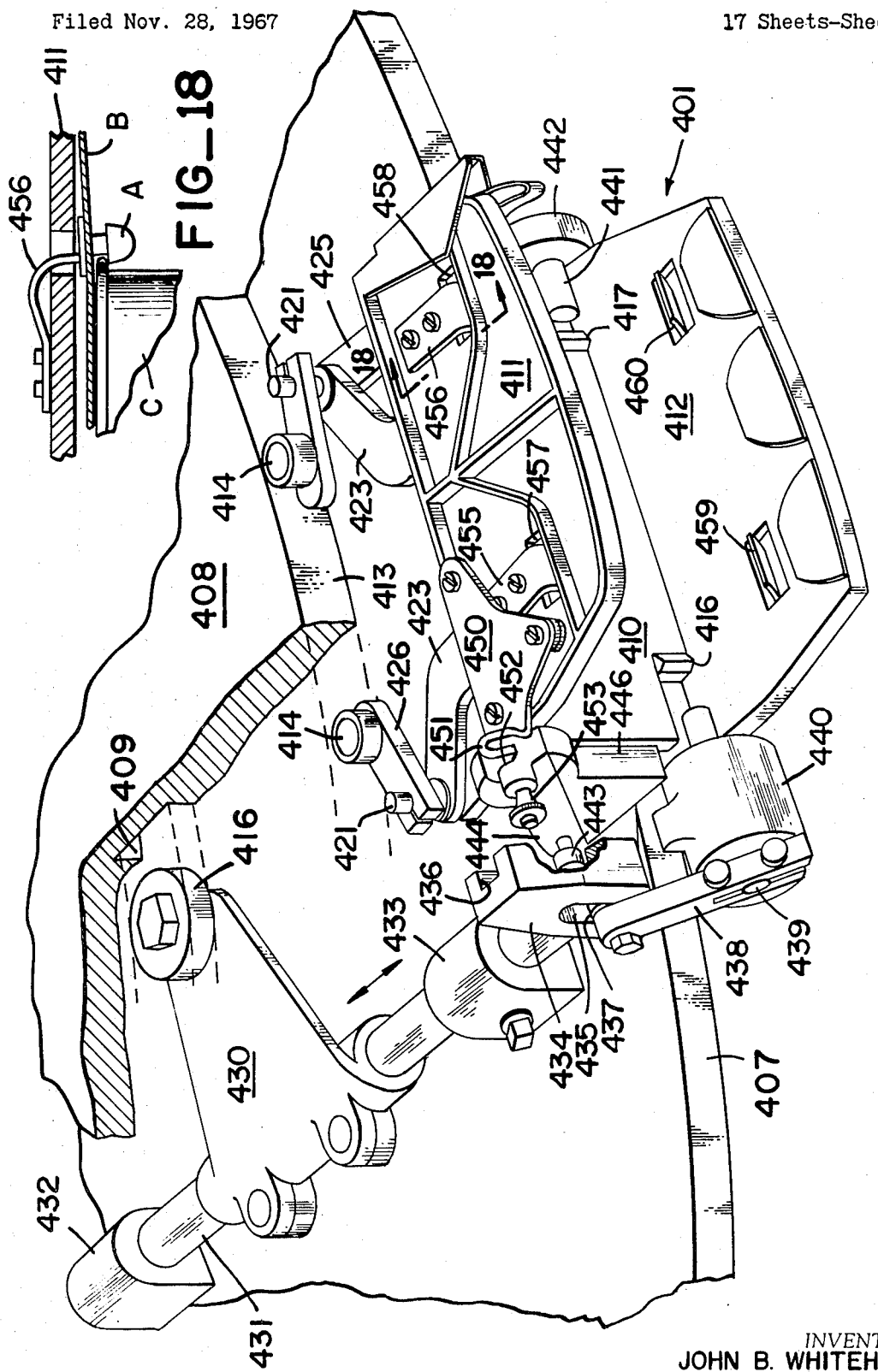

Feb. 16, 1971   J. B. WHITEHOUSE ET AL   3,563,000
PACKAGING APPARATUS
Filed Nov. 28, 1967   17 Sheets-Sheet 11
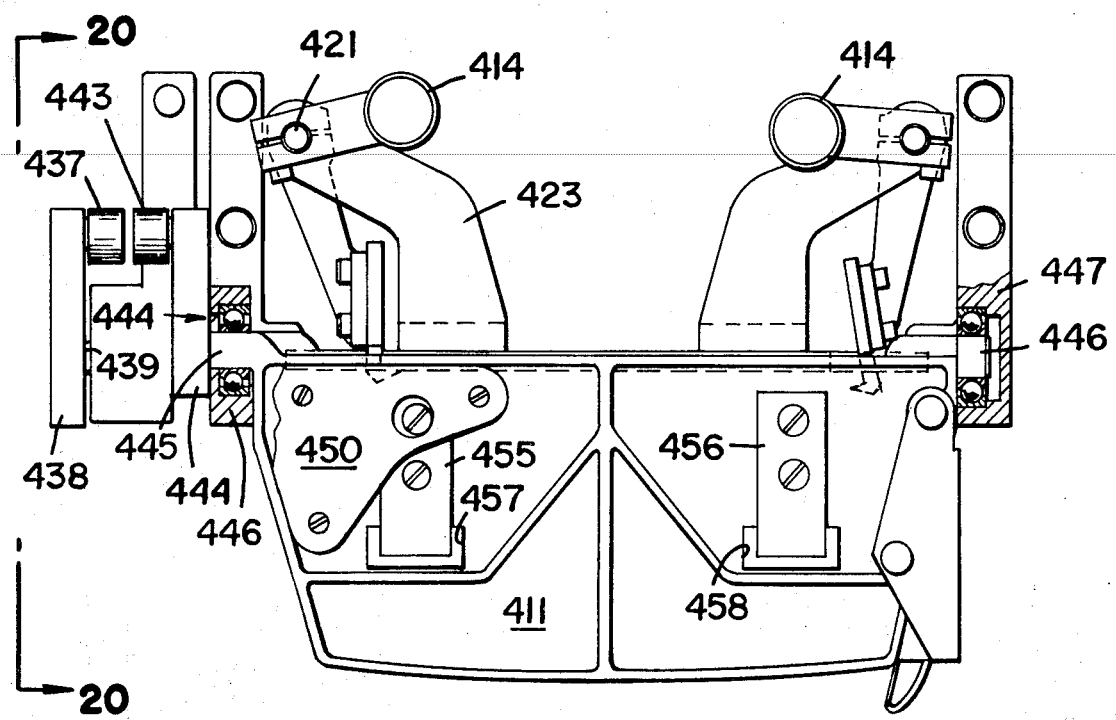
FIG_19
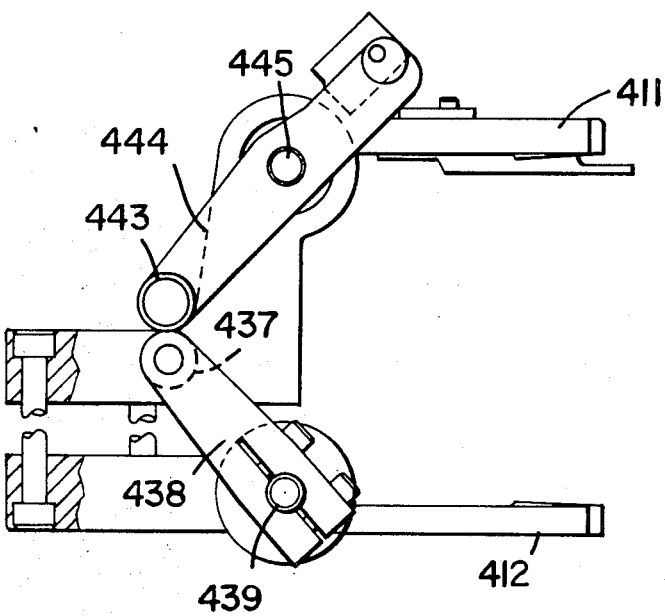
FIG_20
INVENTORS
JOHN B. WHITEHOUSE
GUNNAR G. B. ALHORN
BY
ATTORNEYS

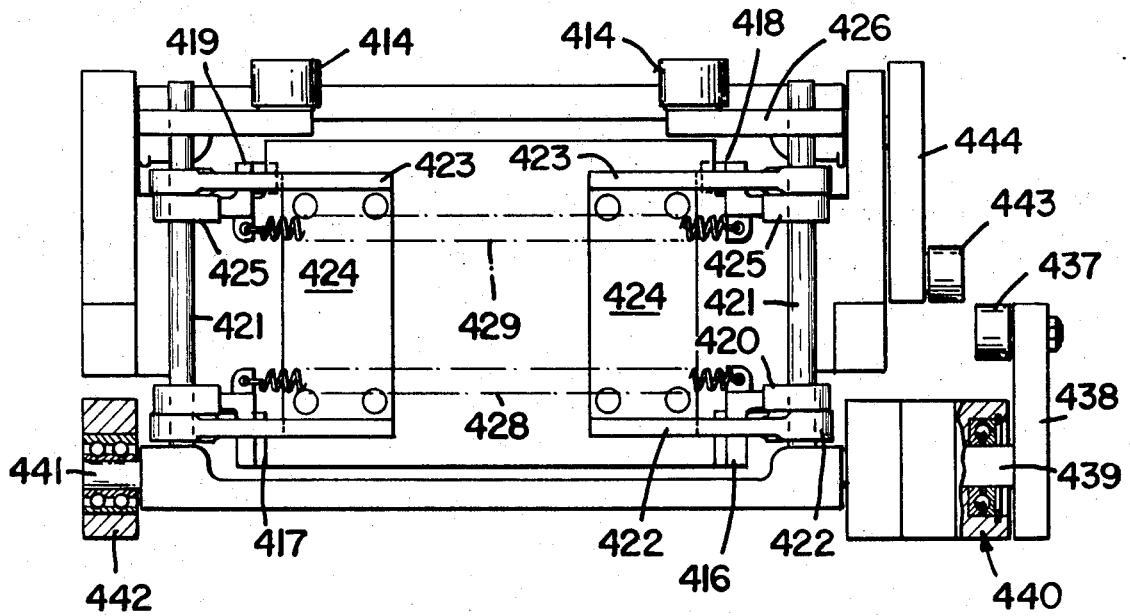
FIG_21

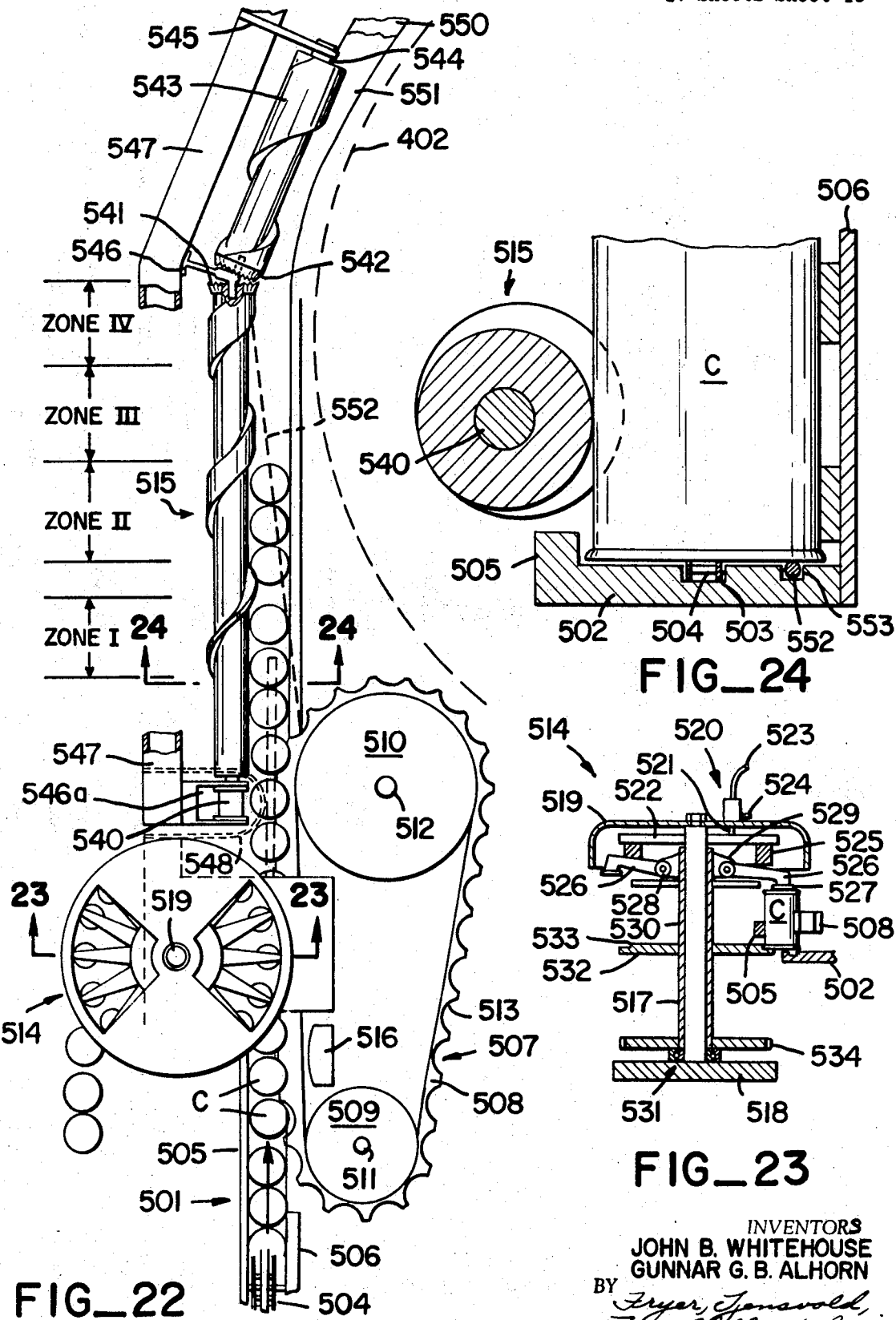

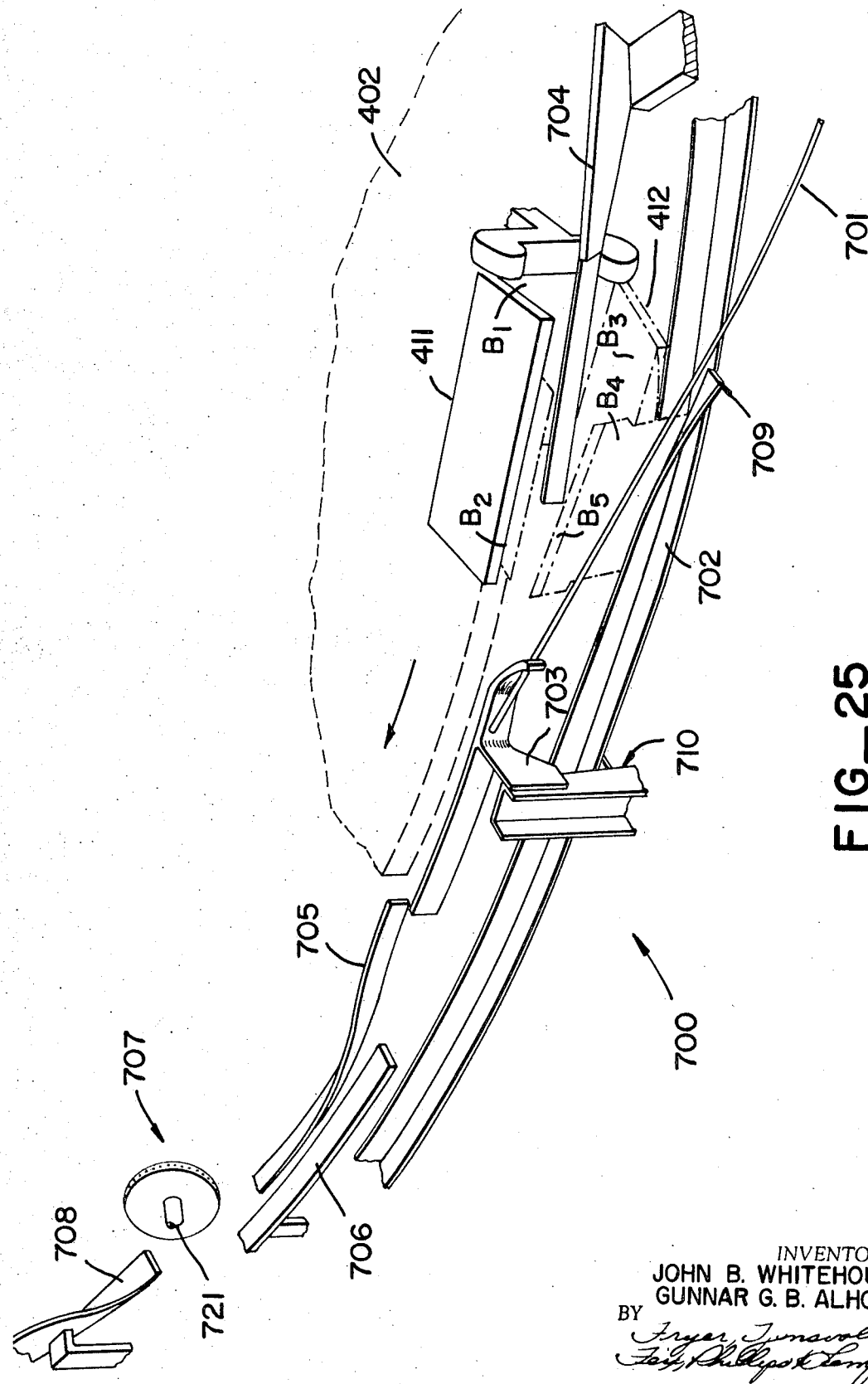

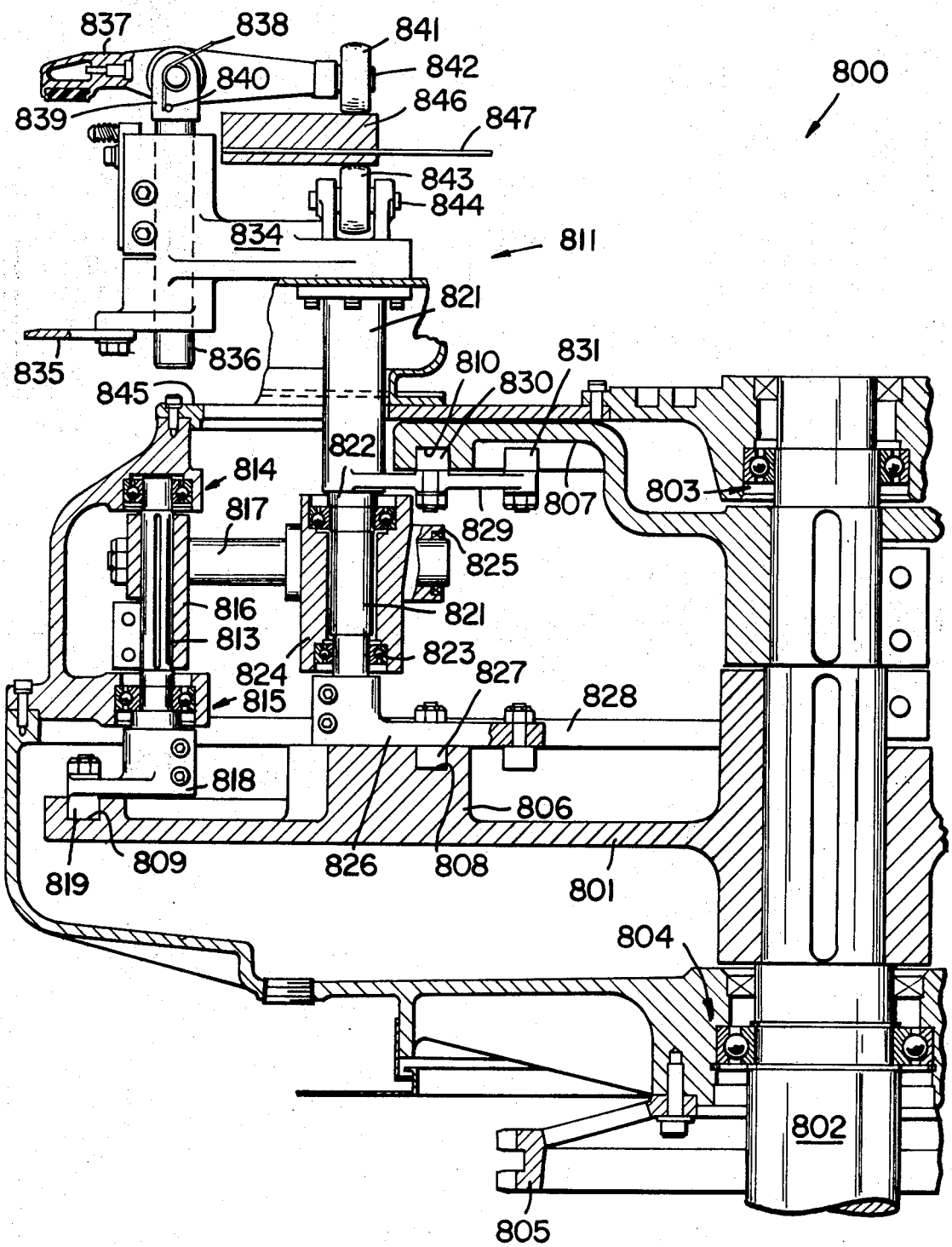
FIG_26

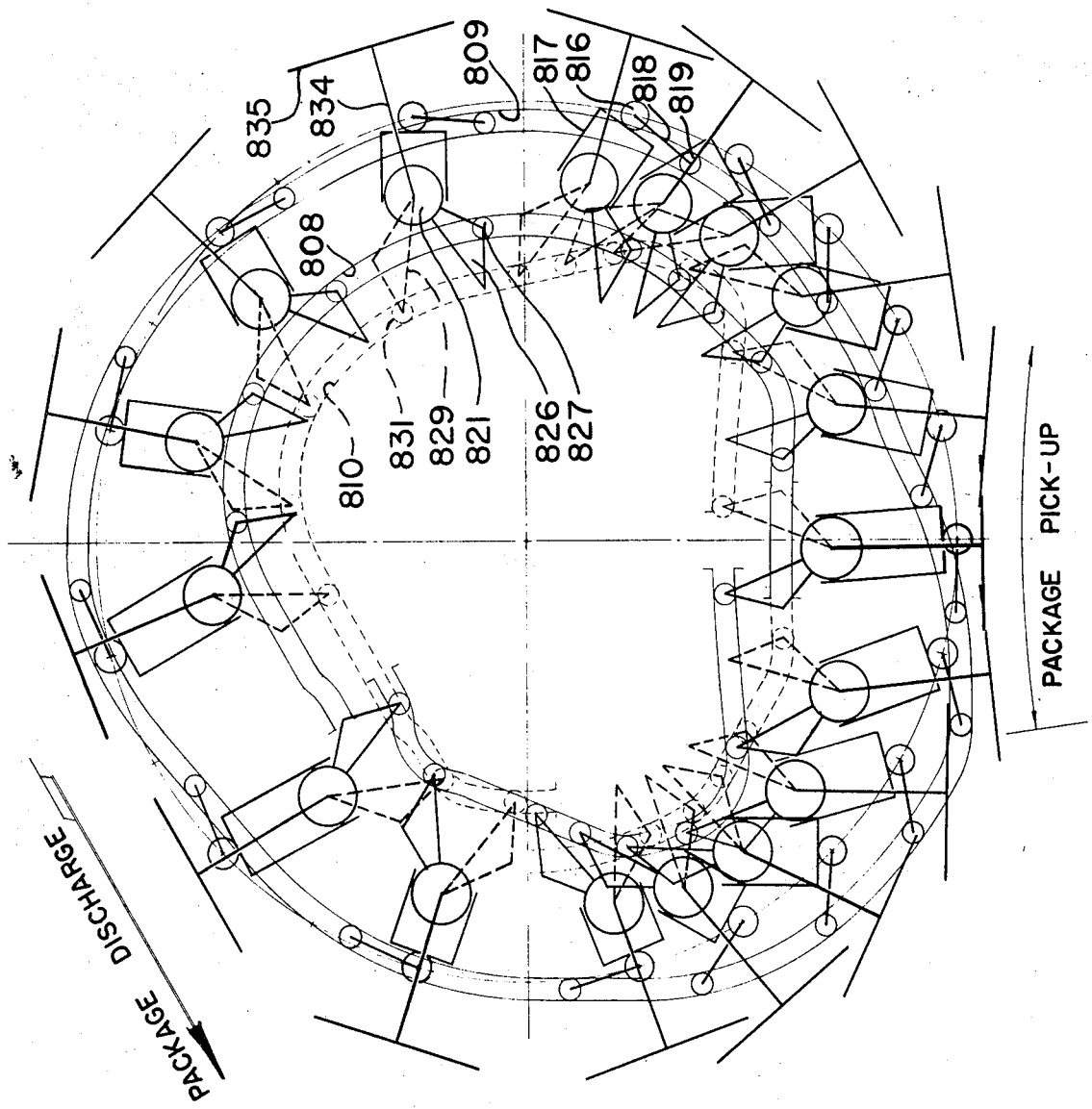

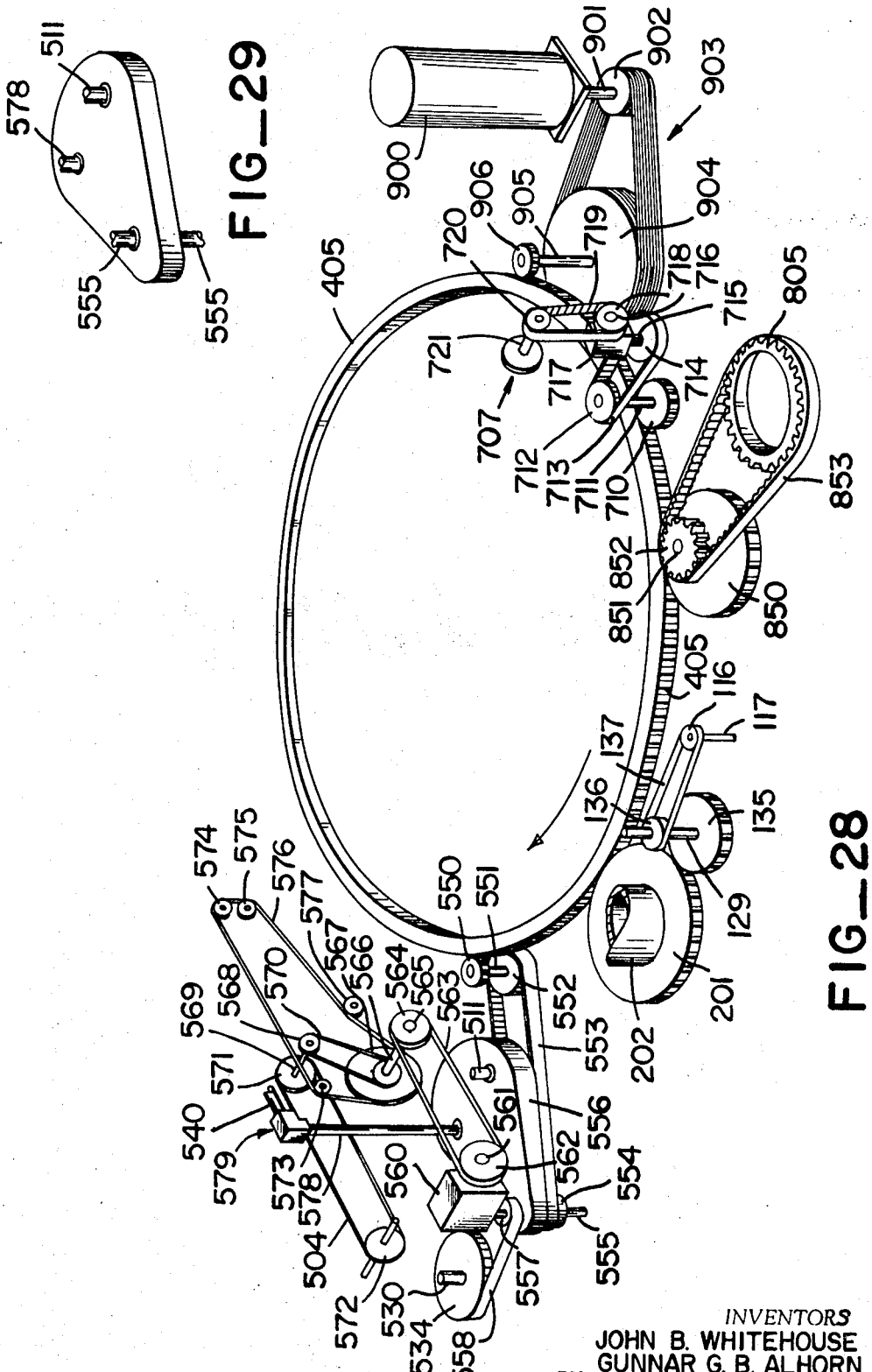

United States Patent Office 3,563,000
Patented Feb. 16, 1971

3,563,000
PACKAGING APPARATUS
John B. Whitehouse and Gunnar G. B. Alhorn, Sunnyvale, Calif., assignors to Fibreboard Corporation, San Francisco, Calif., a corporation of Delaware
Filed Nov. 28, 1967, Ser. No. 686,020
Int. Cl. B65b 5/10
U.S. Cl. 53—48          19 Claims

ABSTRACT OF THE DISCLOSURE

A packaging apparatus comprises a feeder arranged to insert plastic clips into a flattened paperboard blank arranged on a carton assembly turret. The turret rotates to transfer the blank to an articulated cage mounted on a rotatably mounted package assembly turret. The cage closes to form a pocket in the blank which receives a plurality of upstanding cans therein. Upon further rotation of the package assembly turret, the blank is wrapped and secured around the cans. The package is then transferred to a compression and discharge turret.

CROSS-REFERENCE TO A RELATED PATENT

The apparatus and method hereinafter disclosed are particularly adapted for the formation of the types of packages or "six-pack" carriers disclosed in U.S. Pat. No. 3,233,730, assigned to the assignee of this application.

BACKGROUND OF THE INVENTION

The highly competitive nature of the packaging industry dictates the need for low-cost and efficient packaging operations. The packaging of a plurality of cylindrical objects within a paperboard wrapper to form a package or so-called "six-pack" carrier, for example, is perhaps one of the most competitive areas within such industry. Such a package is disclosed in above mentioned U.S. Pat. No. 3,233,730 and comprises a plurality of upstanding cans confined within a blank wrapped therearound.

Conventional apparatus and methods normally form such packages by moving a flattened blank along a linear line or flight and subsequently folding or wrapping the blank around the cans by suitably arranged plow means or the like. Such a conventional packaging procedure generally requires a rather lengthy and complicated series of mechanisms and method steps. The conventional procedure would be further complicated if an attempt were made to form the type of package disclosed in the above-mentioned U.S. patent. For example, such procedure would require modification to adapt it for the insertion of plastic locking clips through apertures formed in the blank to engage can chines therewith.

SUMMARY OF THE INVENTION

This invention overcomes a number of the above, briefly mentioned problems by providing an apparatus and method whereby a blank can be expeditiously and economically wrapped and secured around a plurality of objects, such as cans. A novel aspect of the apparatus phase of this invention comprises the utilization of a rotatably mounted package assembly turret having a plurality of work holders, preferably articulated cage assemblies, mounted therearound. In the preferred embodiment, each cage assembly receives a flat blank and folds it into pocket form. After a plurality of upstanding cans or like objects are fed into such pocket, the blank is wrapped and secured around the cans.

The blanks are preferably fed to the package assembly turret by means of a carton assembly turret having a plurality of suction cups arranged therearound and adapted to transfer the blanks to the coacting cage assemblies. When the apparatus is utilized for forming the type of package disclosed in U.S. Pat. 3,233,730, a clip feeder is arranged to cooperate with the carton assembly turret to insert plastic clips at critical portions thereof prior to the time when the blank is transferred onto the package assembly turret.

When the apparatus is utilized for the packaging of "six-pack" carriers, a first row of three cans are moved into the above-mentioned partially formed pocket by a first infeed means, tangentially relative to the periphery of the circular package assembly turret. Thereafter, continued rotation of the package assembly turret will facilitate the reception of a second row of three cans by such pocket from a second infeed means. A plow and gluer are suitably arranged to fold and secure a glue flap to one of the panels of the blank. A compression and discharge turret is preferably arranged to thereafter receive the package from the package assembly turret to apply a final sealing pressure to the glue flap and to transfer the completed package to a conveyor.

BRIEF DESCRIPTION OF THE DRAWINGS

FIG. 1 is a top plan view illustrating the preferred apparatus embodiment of this invention;

FIG. 2 is a cross-sectional view taken in the direction of arrows 2—2 in FIG. 1;

FIG. 3 is an isometric view schematically illustrating the progressive and continuous packaging operations effected by the apparatus illustrated in FIG. 1;

FIG. 4 is an enlarged top plan view with parts broken away disclosing a clip feeder assembly employed in the FIG. 1 apparatus;

FIGS. 5 and 6 are enlarged sectional views taken in the direction of arrows 5—5 and 6—6, respectively, in FIG. 4;

FIG. 7 is an elevational view of the FIG. 4 clip feeder;

FIGS. 8 and 9 are top plan views with parts broken away illustrating the manner in which the FIG. 4 assembly cooperates with a clip inserter turret to insert plastic clips into a carton blank maintained on a carton assembly turret of the FIG. 1 apparatus;

FIG. 10 is a sectional view taken in the direction of arrows 10—10 in FIG. 8;

FIG. 11 is a sectional view taken in the direction of arrows 11—11 in FIG. 12 illustrating the carton assembly turret;

FIG. 12 is a top plan view of the carton assembly turret of FIG. 11 with parts broken away for clarification purposes;

FIG. 13 is an enlarged partially sectioned view of a vacuum arrangement employed in the carton assembly turret of FIGS. 11 and 12;

FIG. 14 is an enlarged elevational view of a vacuum cup arrangement employed in the carton assembly turret;

FIG. 15 is an enlarged view taken in the direction of arrows 15—15 in FIG. 11;

FIG. 16 is a top plan view of the carton assembly turret schematically illustrating various movements of a vacuum cup arrangement employed therein;

FIG. 17 is an enlarged isometric view with parts broken away illustrating an articulated cage assembly employed in a package assembly turret of the FIG. 1 apparatus;

FIG. 18 is an enlarged sectional view taken in the direction of arrows 18—18 in FIG. 17 illustrating the manner in which a plastic clip is moved into engagement with a can chine;

FIG. 19 is a top plan view of the cage assembly with parts broken away for clarification purposes;

FIG. 20 is a side elevational view of the cage assembly taken in the direction of arrows 20—20 in FIG. 19;

FIG. 21 is a back elevational view of the cage assembly;

FIG. 22 is an enlarged top plan view schematically illustrating a can infeed assembly employed in the FIG. 1 apparatus;

FIG. 23 is a cross-sectional view taken in the direction of arrows 23—23 in FIG. 22;

FIG. 24 is an enlarged sectional view taken in the direction of arrows 24—24 in FIG. 22;

FIG. 25 is an enlarged isometric view with parts broken away schematically illustrating a plow and gluer assembly employed in the FIG. 1 apparatus;

FIG. 26 is an enlarged sectional view taken in the direction of arrows 26—26 in FIG. 1 with parts broken away for clarification purposes illustrating a compression and discharge turret;

FIG. 27 is a top plan view of the compression and discharge turret schematically illustrating various cam track arrangements employed therein;

FIG. 28 schematically illustrates an integrated drive train arranged to actuate various mechanisms employed in the FIG. 1 apparatus; and FIG. 29 is an isometric view illustrating a gear box employed in the FIG. 28 drive train.

DESCRIPTION OF THE PREFERRED APPARATUS EMBODIMENT

General description

Referring to FIGS. 1 and 3, the preferred apparatus embodiment of this invention comprises a clip feeding means or assembly 100 arranged to receive plastic clips A from a clip orientator (not shown). The assembly functions to insert the clips into flat carton blanks B maintained on the periphery of a blank transferring means or carton assembly turret 200. The clips may be of the type disclosed in above-mentioned U.S. Pat. No. 3,233,730. The blanks preferably comprise panels $B_1$, $B_2$, $B_3$ and $B_4$ and a glue flap $B_5$. The carton assembly turret rotates continuously during the packaging operation to pick up the blanks from a conventional carton magazine 300 and transfer them to a rotating package assembly turret 400. The package assembly turret rotates to fold panels $B_1$, $B_2$ and $B_3$ of each blank into pocket form by folding or cage means 401.

Upon further rotation of the turret three cylindrical cans C are fed into such pocket by an object transferring means or first can infeed assembly 500. The cans are substantially confined within the partially folded blank and transferred therewith adjacent to a second can infeed assembly 600. The second infeed is arranged to move three more cans next to the first three cans to begin the final formation of the "six-pack" carrier. The substantially completed package is then moved past a plow and gluing means or assembly 700 to secure glue flap $B_5$ to panel $B_2$ of the carton blank to positively wrap and lock the cans therein.

The package is then transferred to a rotating discharge means or compression and discharge turret 800 which functions to compress glue flap $B_5$ to set and positively secure it. Thereafter, the completed package or "six-pack" carrier is transferred to an output conveyor for subsequent consumer consumption. As will be hereinafter described, a main drive motor 900 is arranged to rotate the package assembly turret which in turn actuates the above assemblies in a synchronized manner.

Clip feeder and inserter assembly 100

Referring more particularly to FIGS. 4 through 7, clip feeding means or feeder and inserter assembly 100 comprises a stationary base 101 having an upstanding column 102 secured thereto. A collar 103 is secured to the column and has an air-actuated actuator 104 pivotally connected thereto by a pivot pin 105. A conduit 106 may be arranged to selectively communicate pressurized air to the actuating chamber, arranged at the piston or head end of the actuator, by a source means (not shown) to selectively extend a piston rod 107 for purposes hereinafter explained.

The actuator may be of the double-acting type or may have a spring suitably arranged therein to return the piston rod to its retracted position when such chamber is depressurized.

A bifurcated end of rod 107 is pivotally connected by pin 109 to a lug secured to a plate 108. Referring more particularly to FIG. 7, the plate is connected between substantially identical clip feed assemblies, generally depicted by numerals 110. Each of the assemblies comprises a clip infeed guide rail 111 secured to a bracket 112. As more clearly illustrated in FIG. 5, rail 111 comprises a longitudinally extending slot 113 constructed and arranged to receive the above-mentioned plastic clips for subsequent insertion into a paperboard blank.

A manifold 114 may be connected to a suitable source of pressurized air (not shown) in order to emit a series of pulsating air streams via conduits 115 which communicate with slot 113. Due to the slanting arrangement of conduits 115 (FIG. 4), the clips will be urged rightwardly by the blasts of air. If so desired, a pulley 116 may be suitably arranged to drive a shaft 117 rotatably journalled in lugs secured to bracket 112. The shaft has spaced rubber faced driving discs 118 and 119 mounted thereon arranged to engage the clips to move them rightwardly in FIG. 4.

An extension 120, secured to bracket 112, is pivotally connected to a first arm 121 of a member 122 by a pivot pin 123. Member 121 is secured to column 102 and has a second arm 124 thereof arranged to abut bracket 112 via adjustable set screw 125. It should be noted that when rod 107 is in its retracted position as illustrated in FIGS. 4 and 7, that bracket 112 abuts the end of set screw 125. The clip feeder assemblies 110 are thus arranged to have the clips picked up at a point whereat bracket 112 meets a curved outfeed guide 126 by an inserter assembly turret hereinafter described (FIGS. 8 and 9).

One or more pins 127 (FIG. 6) may be arranged to project slightly into the clip retaining channel of bracket 112 to retain the clips therebehind prior to the time the inserter forces them thereby. In particular, the pins are suitably constructed and arranged to prevent the clips from moving into outfeed guide 126, but will permit the resilient plastic clips to be forced thereby when they are engaged by inserter assembly turret 128. When it is desired to prevent a clip "pick up" by the inserter wheel, jack 104 is pressurized via conduit 106 to extend rod 107 to move the clip inserter assembly counter-clockwise on pivot pin 123. Thus, the inserter wheel is unable to engage and pick up a clip since bracket 112 and guide are moved out of its circular path.

Referring to FIGS. 8 through 10, inserter assembly turret 128 comprises two identical disc arrangements (one illustrated) keyed or otherwise suitably secured to a rotatably mounted shaft 129. Each disc arrangement substantially lies in the same plane as a respective and cooperating outfeed clip guide 126 in order to facilitate clip transfer. Turret 128 then functions to insert four clips (two by each disc arrangement) into each blank held on carton assembly turret 200. The transfer means employed for transferring each clip comprises a reciprocably mounted plunger 130 (FIG. 10) having projections 131 designed to engage notches formed on the base of the plastic clip. Such projections could be modified to adapt turret 128 for the transfer of clips or other shapes.

Such transfer means further comprises collar 132, secured between two opposed plate members which form the above mentioned disc arrangement. The collar reciprocally mounts a bolt 133 therein having plunger 130 threadably secured thereto. A compression or coil spring 134 is mounted on the bolt between the collar and plunger to urge the plunger to its extended FIG. 8 position. Thus, it can be seen that when the clip is inserted into the blank (FIG. 9) that the plunger will be compressed when it engages the blank to release itself from the clip. Four such transfer means are preferably mounted on the periphery of turret 127 which has its rotary speed synchronized with that of turret 200, as will be hereinafter more fully explained.

Carton assembly turret 200

Referring now to FIGS. 11 through 16, blank transferring means or carton assembly turret 200 comprises a stationary column 201 having a housing 202 rotatably mounted thereon by spaced bearing means 203, 204 and 205. The housing is arranged to be rotated by a ring gear 206 secured to the lower end thereof. A plate 207 is suitably secured to the housing and carries a plurality of radially extending arms 208 and 209 thereon. A curved back up plate 210 is attached to the arms. As more clearly illustrated in FIG. 12, four such plates are preferably attached to the housing and positioned approximately 90° from each other about the periphery of the carton assembly turret. The back up plate has strips 210a and 210b inserted in the face thereof (FIG. 15), the strips having suitable apertures formed therein to receive the shank ends of above-mentioned plastic clips A.

Each stationary suction cup assembly comprises a plurality of vacuum or suction cups 211 secured to the back up plate. Each cup comprises a flexible rubber cup shaped member arranged to project through suitably arranged apertures formed in the plate (FIG. 15). The front face of each cup preferably projects slightly ahead of the outer surface of the back up plate to facilitate grasping of a carton blank thereby. Six such cups are preferably arranged in a vertically aligned manner to assure that such a grasping function will be carried forth even though a cup or cups are rendered inoperative.

The suction cup comprises a conventional design wherein a spring loaded and reciprocal valve stem 212 (FIG. 14) is adapted to be depressed when engaged by a portion of the carton blank. Upon depression of the valve stem, the cup chamber is exposed to a low pressure, i.e. a vacuum, to hold the blank thereon. A suitable conduit arrangement 213 is arranged to communicate a vacuum source (not shown) to the cup chamber via a first ring member 214. The first ring member is rotatably mounted along with a second ring member 215 on a cylindrical collar 216.

The collar is attached to column 202 by a nut 217 threadably secured thereto. Pins 218 are suitably positioned in opposed apertures formed in housing 203 and each of the rotatable ring members 214 and 215 to maintain the members in a predetermined radial position relative to collar 216 and to the longitudinal axis of column 201. Compression or coil springs 219 are arranged on the pins between the housing and ring members to urge the members into sealing relationship with the top surface of collar 216.

Such a sealing relationship is required to communicate the above-mentioned vacuum source to suction cups 211 via a fitting 220, a vertically disposed passage 221 formed in column 201, a passage 222 formed in collar 216 and conduit arrangement 213 (FIG. 13). Passages 221 and 222 are sealed by suitably arranged O-ring seals 223 positioned between column 201 and collar 216. Passage 222 divides into two branches arranged to communicate with arcuate slots 224 and 225, formed in the top surface of collar 216 (FIGS. 13 and 16). Conduit 213 is arranged to communicate with slot 224 whereas a second conduit 226 communicates with slot 225. Conduit 226 in turn communicates with a second group of movable suction cups 227 which are substantially identical to suction cups 211.

Each movable suction cup assembly comprises a plate 228 arranged to connect and carry two cups 227 thereon. The plate is attached to a reciprocal rod 229. The rod has a compression or coil spring 230 arranged thereon to urge plate 228 radially outwardly (FIG. 14). A nut 231 is threadably secured to the other end of rod 229 to limit the outward movement of the rod in a bracket 232 wherein the rod is mounted. The bracket is keyed or otherwise suitably secured to a rockable shaft 233 journalled in spaced bearings 234 and 235. The upper end of the shaft has a plate 236 secured thereto having cam followers 237 and 238 mounted thereon (FIG. 11). A circular cam plate 239 is attached to housing 202 and has cam tracks or slots 240 and 241 formed therein (FIGS. 11 and 12), arranged to receive followers 237 and 238, respectively.

Bearings 234 and 235 are mounted in a bellcrank or swivel member 242 which is in turn secured to a shaft 243, rockably mounted in spaced bearings 244 and 245 attached to housing 202. Thus, it can be seen that a rocking of shaft 243 will function to swivel member 242 to rock shaft 233 and move cups 227. A plate 246 is secured to the lower end of shaft 243 and carries a plurality of cam followers or rollers 247–250 thereon. The rollers are arranged to engage the various cam tracks illustrated in FIG. 16 for purposes of picking up a carton blank out of carton magazine 300 and transferring it to package assembly turret 400. A main cam track 251 is arranged to guide the path of roller 247 whereas the second bottom roller 248 is guided by a cam track 242 to accelerate and position bellcrank 252 prior to the time suction cups 227 arrive at the carton pick-up station.

The separate cam tracks 251 and 252 and associated followers 247 and 248 are preferably employed since shaft 243 is rotated through an angle of 180°. Such rotation could not be effected by a standard cam and follower arrangement. It should be further noted that when follower 247 leaves the end of track 251 that follower 248 enters track 252. Cam track 252 cooperates with cam plate 253 to rotate bellcrank 242 180° which in turn causes suction cups 227 to move around the periphery of carton assembly turret 200 at a much higher speed than the rotary speed of the turret. The reverse of this "cocking" motion is later used at the carton pickup station to cancel out the peripheral motion of vacuum cups 227 to create a momentary "dwell" for carton pick up purposes.

The vacuum cups move in against the carton stack, attach themselves to a carton blank and retract to pull the blank away from the magazine during such "dwell." In particular, cam plates 254 cooperate with cam track 251 via follower 250 to move the cups radially outwardly toward the center magazine during the "dwell." Referring to FIG. 11, upper rollers 237 and 238 are arranged to engage cam tracks 240 and 241, respectively, to cooperate with track 252 to maintain the axis of the cups substantially radial relative to the vertically disposed longitudinal axis of column 202 at all times during the cycle.

Referring again to FIGS. 1 and 3, carton magazine 300 is conventional and comprises a frame 301 having a pneumatically actuated ram 302 suitably mounted therein to urge the stack of carton blanks C toward carton assembly turret 200. Means (not shown) are provided at the forward end of the carton magazine for permitting a single carton blank to be picked up by the above described carton assembly turret. Such means may, for example, comprise the type of carton retention mechanisms disclosed in U.S. Pat. No. 3,242,827 assigned to the assignee of this invention.

Package assembly turret 400

Referring to FIGS. 2 and 17–21, package assembly turret 400 includes a plurality of folding means 401 preferably comprising articulated cage-like die and wing assemblies mounted on the periphery of rotatable bowl-shaped member 402. Bowl 402 is mounted for rotation about a vertically disposed axis on a stationary housing 403 by bearing means 404 (FIG. 2). A bull or ring gear 405 is secured to a flared portion 406 arranged at the bottom edge of the bowl to drive the various mechanisms of the packaging apparatus as will be hereinafter described. The bowl further comprises a horizontally disposed table portion 407 whereat the major phases of the packaging operation are accomplished. A cam plate 408, having a captive-type cam track 409 arranged therein, is secured to an overhanging portion of housing 403 for purposes hereinafter described.

Each cage assembly (FIG. 17) comprises a vertically disposed first plate 410 attached to table portion 407 of bowl 402 and second and third plates 411 and 412 pivotally mounted at opposite edges of the first plate. In the preferred embodiment, sixteen such cages are mounted on the periphery of the rotatable bowl. Upon each complete revolution of the bowl, a carrier is completed in each of the sixteen cages. The point at which carton assembly turret transfers a carton blank to a cage of the package assembly turret will be hereinafter noted as the 0° position or point of reference for describing subsequent packaging operations.

Stationary plate 410 preferably approximates the same vertical height as the object which is packaged therein, e.g., the height of a standard twelve ounce can approximates five inches. Plates 410, 411 and 412 are normally maintained in substantially the same vertical plane at the 0° position and thereafter plates 411 and 412 pivot approximately 90° toward each other to form the carton blank into a pocket adapted to receive six cans therein. A cam surface 413 is formed on the leading edge of stationary plate 408 (FIGS. 1 and 16) to engage rollers 414 whereas a roller 415 engages cam track 409. Rollers 414 actuate four pivoted carton grippers 416–419, arranged to grip a carton blank at the carton assembly turret or 0° position. At this point the three plates of the cage are arranged in the above-mentioned vertical plane to facilitate such gripping.

The first pair of grippers 416 and 418 (FIG. 21) are arranged on one side of the cage to grip one vertically disposed edge of the blank whereas the second pair 417 and 419 grip the opposite edge thereof. The mechanisms for actuating the respective pairs of grippers are identical and therefore only one such mechanism will be described. Gripper 416 is secured to a collar 420 which is in turn secured to a rockable shaft 421. Shaft 421 is journalled in suitably arranged bearing means mounted in spaced arms 422 ad 423, secured to stationary plate 410 by a bracket 424. The upper gripper 418 is secured to a lever 425 which is also attached to shaft 421. The shaft is also secured to a lever 426 which has roller 414 mounted thereon.

The roller is arranged to engage a raised portion 427 (FIG. 1) of cam 413 to spread the grippers outwardly in slots formed in plate 410 to release a completed carrier at the 300° position (at the compression and discharge turret 800) and to facilitate reception of a blank at the 0° position. Upon further clockwise rotation of the package assembly turret in FIG. 1, it can be seen that rollers 414 will ride off a tapered end 428 of cam portion 427 to permit a gradual closing of the grippers under the influence of coil springs 428 and 429, i.e., the springs are arranged to pull the grippers toward each other to clamp the blank on plate 410.

Cam track 409 is suitably designed to gradually pivot plates 411 and 412 toward their FIG. 17 position whereby the blank is folded by the pocket formed thereby. Such a folding function preferably starts at approximately the 45° position of turret 400 rotation. Follower or roller 415 is captured in stationary cam track 409 to reciprocate radially relative to the vertical longitudinal axis of the package assembly turret. Roller 415 is rotatably mounted on a bracket 430 which is clamped to a rod 431, slidably mounted in spaced bearings 432 and 433 mounted on bowl 402.

A guide member 434 is secured to one end of the rod and has lost motion slots 435 and 436 formed therein on opposite sides thereof. Slot 435 is arranged to receive and capture a roller 437 which is rotatably mounted on an end of a link 438. The link has its other end suitably clamped to the outer end of a rockable shaft 439, rockably mounted in a bearing means 440 secured to table portion 407 of the bowl. The inner end of the shaft is suitably secured to one end of lower plate 412 to impart pivotal movement thereto. The other end of the plate has a stub shaft 441 secured thereto (FIG. 21) and suitably journalled in bearing means arranged in an extension 442 secured to table portion 407.

Thus when shiftable rod 431 is retracted to its FIG. 20 position under the influence of cam track 409, member 434 will move radially inwardly to pivot link 438 counterclockwise (FIG. 19) about the axis of shaft 439. Such pivotal movement is permitted since roller 437 is free to move downwardly in lost motion slot 435. Thus plate 412 is also pivoted to its FIG. 20 position. Conversely, it can be seen that radial outward movement of rod 431 will function to pivot plate 412 to a vertically disposed position to facilitate reception of the flattened blank thereon.

Simultaneously with the above described movement of plate 412, movement of plate 411 is effected by means of a roller 443 captured in lost motion slot 436. The roller is rotatably mounted on a second link 444 which is secured to a first end of a shaft 445 (FIG. 19). Shaft 445 is journalled in suitable bearing means arranged in an arm 446 secured to bowl 402 and has a second end thereof secured to plate 411. The other end of plate 411 has a stub shaft 446 secured thereto, suitably journalled in bearing means arranged in an extension 447 secured to bowl 402. Thus, upon radial inward movement of rod 431 to its FIG. 16 position, plate 411 will be pivoted horizontally to overlie plate 412. A plate 450 may be secured in raised position on plate 411 by screws arranged in slotted holes to facilitate angular adjustment of the plate. Plate 450 has a bent portion 451 retained in slot 452 formed in link 444 by a quick release pin 453. The latter arrangement permits opening of the cage by removal of the release pin.

FIGS. 17 and 18 illustrate small leaf springs 455 and 456 secured to plate 411 at one end thereof and having arcuate end portions arranged to extend through slots 457 and 458, respectively, formed in such plate. The springs are utilized for clip-positioning purposes. In particular, when a can C is fed into the partially formed blank, the arcuate end portion of resilient spring 456, for example, will engage the flat head end of clip A to urge and pivot the clip downwardly (FIG. 18). The shank end of clip A is thus moved into engagement with the can's chine to lock it in position. The spring preferably engages the clip in off-center relationship thereto in order to effectively rock or pivot the clip to snap into such position. Further downward movement of plate 411 will cause the plate to move the clip into its fully locked position. When clips are also employed in the opposed or top panel $B_3$ (FIG. 3) of the carton blank, additional leaf springs 459 and 460 may be arranged in a like manner.

Can infeed assembly 500

Referring to FIGS. 1 and 22 through 24, an object transferring means or first can infeed assembly 500 is substantially identical to a second can infeed assembly 600. Therefore, only the structural details of the first infeed assembly will be explained. When the last two numbers of the numerals depicting various components employed in the respective infeed assemblies correspond to each other, identical components are depicted. The first infeed assembly comprises a block-chain conveyor assembly 501 arranged to feed cans C toward the periphery of package assembly turret 400. It should be noted that the linear flight of the cans is arranged substantially tangential with respect to the periphery of the turret.

A plate 502 (FIG. 24) may be arranged to support the cans thereon in a conventional manner and has a groove 503 constructed and arranged in the top surface thereof to house an endless chain 504. The chain links project slightly above the flat top surface of plate 502 in order to engage the lower ends of the cans to move them in the linear direction of the illustrated arrow (FIG. 22). A vertically disposed rail 505 or the like may be suitably attached to plate 502 to cooperate with a second plate or wall 506 to prevent lateral movements of the cans during their travel. The drive means for chain 504 and for the remaining infeed assembly components will be hereinafter explained.

A lugged-belt assembly 507 is constructed and arranged adjacent to conveyor 501 to engage side portions of the cans to aid in their conveyance. Such assembly comprises an endless belt 508 suitably trained on a drive pulley 510 and an idler pulley 509 mounted on stationary shafts 511 and 512, respectively. The assembly essentially functions as a can-positioning and moving device by means of semi-circular pockets 513 formed on the periphery thereof and arranged to engage and substantially conform to mating cylindrical surface portions of the cans. As will be hereinafter described, the speeds of chain 504, belt 508, a no-carton-no-can assembly or diverting means 514 and a feed screw 515 are synchronized with respect to each other.

It should be noted that pockets 513 of the belt are substantially jam-proof and will function to receive cans even though they are randomly spaced. Such an arrangement contrasts with a conventional star wheel, for example, which will not accept an incoming can unless its movement is exactly timed with respect to the star wheel. The belt preferably comprises a soft neoprene rubber (60 durometer) cemented onto a standard two inch wide rubber-wire reinforced timing belt, for example. The pockets are formed in the rubber constituent and are suitably sized and spaced to accept standard twelve or eleven ounce cans, for example, the latter size having a smaller diameter than the first one. As will be hereinafter more fully described, pulley 510 is preferably driven at approximately one-fifth the speed of the hereinafter described can feeder screw 515 which must make one complete revolution to move three cans therethrough. In addition, pulley 510 preferably rotates at approximately 3.2 times the rotary speed of bowl 402, i.e., 60 r.p.m. at 300 carriers per minute.

The belt may be urged into gradual and substantial tangential engagement with the linear row of cans by means of a curved backup plate 516 upon which engages the inside surface of the belt. The belt is substantially free to flex between plate 516 and pulley 509 to accommodate itself to the incoming cans which may be slightly mis-spaced. Continual movement and flexing of the belt will function to move each can into a belt pocket 513. As the belt approaches plate 516, it becomes increasingly stiff to cam the cans into their final and proper position.

No-carton-no-can assembly 514 will now be described briefly. This assembly may be employed, if so desired, to selectively divert incoming cans in response to an appropriately arranged sensing means (not shown). Such sensing means may be arranged on carton assembly turret 200, for example, to signal assembly 514 when a carton blank is not fed to one of the cages. For example, for each carton blank which is not picked up by the carton assembly turret, three cans may be removed from conveyor 501. The three cans are so removed during the time when lugged-belt assembly 507 has control thereover and before they enter infeed screw 515. Also, cans may be diverted during startup of the packaging apparatus or during a regular programmed stop.

Referring more particularly to FIG. 23, assembly 514 comprises an upstanding column 517 secured to a stationary plate 518. An umbrella shaped cover plate 519 may be suitably attached to the top end of the column. Plate 519 has the housing of a conventional air actuated device 520 secured thereto. The device comprises a piston reciprocally mounted therein arranged to have its piston rod 521 project through an aperture formed in plate 519 and secured to a cam plate 522. The cam plate is slidably mounted on column 517. Actuator 520 may constitute a conventional double-acting type, i.e., a first conduit 523 may be arranged to pressurize the head end of the actuator to move rod 521 downwardly and a second conduit 524 may be arranged to pressurize the rod end thereof to move the rod 521 upwardly upon depressurization of the head end of the actuator.

Cam plate 522 comprises a camming portion 525 adapted to be lowered to the position indicated in FIG. 26 whereby it engages a clamping arm 526, having a rubber cushion 527 arranged on the free end thereof. The clamping arm is pivoted by a pivot pin 528 to a lug 529 secured to a hollow shaft 530, rotatably mounted on stationary column 517 by bearing means 531. A circular plate member 532 is secured to the shaft and has a circular notch 533 formed on the periphery thereof and arranged to underlie the bottom portion of cans C. A gear 534, secured to shaft 530, is adapted to drive the shaft via a drive train hereinafter described.

Thus it can be seen that when actuator 520 receives a suitable signal to pressurize conduit 523 and to depressurize conduit 524, that plate 522 will be lowered to its FIG. 23 position to permit a selected number of clamping arms (such as three) to engage camming portion 525. Program means (not shown) will then function to automatically pressurize conduit 524 and depressurize conduit 523 to move plate 522 upwardly to resume a normal uninterrupted can feed. Cam portion 525 will function during the latter interrupted condition to pivot each clamping arm to retain a can between cushion 527 thereof and plate 532. The clamping arms may be spring loaded (not shown) to return them to their raised position when they leave cam 525 at a point approximately 180° about the vertically disposed axis of column 517. In actual application, shaft 530 is arranged to rotate at approximately three times the rotary speed of bowl 402 by drive means hereinafter described.

First can infeed assembly 500 further comprises infeed screw 515 arranged to be driven by a shaft 540 connected to a suitable drive train (FIG. 27), hereinafter described. The prime functions of the infeed screw is to separate the incoming cans into groups of three, accelerate the cans to approximately the tangential velocity of bowl 402, move the cans into their proper position in the partially formed carton blank maintained in cage assembly 401 and to hold the cans therein for a sufficient period of time to allow the blank to substantially encapsulate them.

In actual application, the screw approximates a length of about 51 inches and is essentially divided in the following zones: (I) A first constant speed and pitch zone approximately two inches in length arranged adjacent to input shaft 540 and designed to receive and move the cans at approximately the linear speed of conveyor 504; (II) An acceleration and separation zone approximating thirty-six inches in length wherein the cans are accelerated from such conveyor speed to the tangential speed of the table, due to the gradually increasing screw pitch, and substantially divided into groups of three; (III) A second constant speed and pitch zone approximating five inches in length for moving the cans at a linear speed approximating the tangential speed of bowl 402; and (IV) A can retention zone approximating seven and three-quarter inches in length for holding the cans in position in the partially formed carton blank; the root diameter of the screw in this zone arranged to flare outwardly therefrom to maintain contact with the cans as they commence their circular travel on the package assembly turret.

Throughout zone IV and during approximately the last two inches of zone III, the screw is cut to provide individual grooves for each group of three cans. Such an arrangement is preferred so as to maintain the cans in linear alignment even though they assume a circular path when transferred to the package assembly turret. Otherwise stated, when the cans are properly positioned in the partially formed carton blank, the middle can of the group is approximately one-eighth of an inch closer to the vertically disposed central axis of bowl 402, than the two flanking cans. Thus the center can groove on the screw should be cut to push the center can one-eighth ot an inch farther "in" than the other two cans. The outside diameter of screw 515 is normally limited by the height of panel $B_1$ (FIG. 3). Such height is in turn determined by the height of the cans since the screw preferably enters a portion of the pocket, formed by the carton blank, with the cans. For example, when the packaging apparatus was adjusted for the packaging of fifteen ounce cans, constituting a height of $4^{13}/_{16}$ in., the outside diameter of screw 515 approximated four and one-half inches.

First infeed screw 515 has a bevel gear 541 secured to the second end thereof arranged to mesh with a bevel gear 542 secured to a positioning screw 543. Screw 543 thus functions as an extension of the first infeed screw to hold the inner row of cans in their proper position in the partially formed carton until plates 411 and 412 of cage 401 fully close. The angle occurring between the axes of screws 515 and 543 approximated 157½° in one application. Screw 543 is mounted on a shaft 544, journalled at its second end in a stationary bracket 545. The screw is constructed and arranged similar to the zone IV portion of screw 515 and comprises a length approximating fifteen inches. In particular, screw 543 has an "hour glass" shape wherein each can is precisely trapped and guided by the varying minor diameter thereof.

Bevel gears 541 and 542 may constitute the same material as that employed for the fabrication of screws 515 and 543, e.g., "Nylatron." The outside diameters of the gears are designed to substantially coincide with the outer diameters of the screws to afford a continuous and smooth transitional surface for can movement therebetween. Shafts 540 and 544 of the feed screws are rotatably journalled in brackets 545, 546 and 546a attached to a tubular member 547 (FIGS. 2 and 17). The member, horizontally disposed adjacent to the screws and approximately on the same level therewith, may be in turn supported by a steel flexure member 548 having a U-shaped cross section (FIG. 2). The latter member is preferably designed so that the axis of the flexure is vertical and approximately intersects the center line of drive shaft 540 of the infeed screw. The outboard end of member 547 may be supported by one or more curved columns Y, slidably resting on stationary pedestals 549. Suitable locking means are provided to detachably secure the columns and pedestals together. Thus the screws can be adjustably mounted toward or away from bowl 402 to adapt them for cans of various size.

Upper and lower stationary plates 550 and 551 may be affixed to stationary housing 403 adjacent to the cans during the cans' travel through the screw (FIG. 2). Similar plates (not shown) may be arranged at other desirable locations about bowl 402 to retain the cans vertically. The vertical distance between the plates is sufficiently large to allow the cans to pass therethrough but sufficiently small to prevent the cans from tipping over. The plates may be further arranged to guide the carton panels. Referring briefly to FIGS. 2 and 3, panel $B_2$ would be guided by the top surface of plate 550 and panels $B_3$ and $B_4$ would be guided by the lower surface of plate 551. The inner edges of additional plates (not shown) may be suitably curved to engage outer surface portions of cans C to guide and position them during their travel on turret 400. Thus, stationary plates may be suitably arranged adjacent to bowl 402 of the package assembly turret to control the position of the cans as well as carton panels $B_2$, $B_3$ and $B_4$ during the packaging operation.

In order to aid the infeed screws in their function of moving the cans toward the package assembly turret, an endless cable 552 may be suitably mounted in a groove formed in the top surface of plate 502 (FIG. 24). The cable has a portion thereof lying above such surface to frictionally engage the bottom of the cans. The cable conveyor is preferably arranged to aid in moving the cans at least through zones II and III (FIG. 22). Since the velocity of the cans is rapidly changing, the cable is preferably run at a slightly greater speed than the maximum can speed, i.e. the tangential velocity of the table.

Second can infeed assembly 600 is substantially identical to the first one. One change, for example, constitutes the elimination of a positioning screw 543 of the first assembly. Once the second group of three cans are positioned in the partially formed blank by screw 615, a suitable backup bar (not shown) may be arranged to hold them therein. Also, screw 615 is constructed slightly different than screw 515 since the second group of cans must be accelerated to a slightly higher linear speed than the first group of cans. Such change is required since the second group is located at a greater radial distance from the central axis of the rotation of bowl 402, i.e. the second group of cans will have a higher tangential velocity than the first group.

Plow and gluing assembly 700

Referring to FIGS. 1, 3 and 25, plow and gluing means or assembly 700 is preferably arranged between the 200° and 270° positions. After the second row of cans are in place, panel $B_4$ of the blank engages a plow bar 701 suitably secured to stationary bracket 703 and tubular member 547. A stationary member 704 may be arranged to have surface portions thereof bear against portions of the six cans (not shown) during this folding function to retain them in their proper position. Upon further rotation of bowl 402, panel $B_4$ will be folded vertically against the inside surface of stationary bracket 703. A plow 709 functions to crease and square lower corners of the package.

Glue flap $B_5$ then engages the outer surface of a stationary and twisted plow 705 to reverse fold the glue flap to a horizontally disposed position on top of a backup plate 706. Plow 705 and plate 706 may be secured to stationary brackets 702 by means, not shown. A glue applicator, generally shown at 707, is then arranged at approximately the 270° position to apply a suitable glue pattern to the inner surface of flop $B_5$. The flap is then reverse folded adjacent to panel $B_2$ by a plow 708. Actual closing of the glue joint is preferably accomplished by the clamping means of the compression discharge turret, hereinafter described. Gluer 707 may comprise a conventional wheel-type hot melt glue applicator which applies the glue in a pattern of small dots, for example. As described below, the gluer is driven in timed relationship with respect to the rotation of bowl 402.

Compression and discharge turret 800

Referring to FIGS. 1, 26 and 27, a carrier discharge means or compression and discharge turret 800 primarily functions to close and apply a final sealing pressure to flap $B_5$ and to discharge the carrier out of the packaging apparatus. The turret comprises a drum shaped housing 801 supported for rotation about a vertically disposed axis on a stationary column 802 by spaced bearing means 803 and 804. A drive sprocket 805 is secured to the lower end of the bowl and is adapted to be driven by drive mechanisms hereinafter described. First and second cam plates 806 and 807 are secured to the column by suitable spline connections or the like. The first cam plate comprises cam tracks 808 and 809 whereas the second cam plate comprises a single cam track 810. The second cam plate has a circumference approximating two-thirds of the first cam plate's circumference.

Six compression and discharge units, generally shown at 811, are mounted on bowl 801 radially outwardly of the vertically disposed axis of column 802. Each unit comprises a pivot shaft 813 journalled in bearings 814 and 815 mounted in the housing. A casing 816 is secured to shaft 813 by a suitable spline connection and has two reciprocal rods 817 securely mounted on opposite sides thereof; only one rod being shown in FIG. 26. A bellcrank arm 818 is attached to the lower end of shaft 813 and carries a cam follower or roller 819 thereon arranged to engage cam track 809. As will be hereinafter understood, cam track 809 and follower 819 control the angular position of rods 817 with respect to a vertically disposed plane arranged to intersect the axes of column 802 and shaft 813.

A second vertically disposed pivot shaft 821 is mounted in spaced bearings 822 and 823 arranged in a collar 824. Collar 824 comprises two tubular portions 825 (only one shown) arranged to slidably mount rods 817 therein. A bell crank arm 826 is attached to the lower end of shaft 821 and carries cam followers or rollers 827 and 828 thereon. The rollers are arranged to selectively engage cam track 808. A third bellcrank arm 829 is secured to shaft 821 above collar 824 and carries rollers 830 and 831 thereon. The latter rollers are arranged to selectively engage cam track 810. The upper end of shaft 821 has a bracket 834 secured thereto which in turn has a plate 835 secured to its lower end. The plate extends radially outwardly and is further arranged to receive a substantially completed package thereon when it is transferred thereto from package assembly turret 400.

A shaft 836 is secured to bracket 834 and has a clamping means comprising member 837 pivotally mounted on the top end thereof by pivot pin 838. A first end of a spring 839 is arranged to engage a pin 840, secured to shaft 836, whereas the spring's second end is arranged to overlie member 837 to urge the member clockwise about pivot pin 838. A first roller 841 is rotatably mounted on member 837 by a pivot pin 842 and a second roller 843 is mounted in a bifurcated end of shaft 821 by pivot pin 844. Aperture 834 are suitably formed in housing 801 to provide the necessary clearance for the various movement imparted to the assembly. As schematically illustrated in FIG. 27, the path of the clamping assemblies is governed by the cam grooves acting on rod 813 through the cam follower arms previously mentioned.

It should be noted that arms 829 and 826 are arranged to substantially engage flat portions of cam plates 806 and 807, respectively, to prevent the clamping head 835–837 from tilting and twisting during their various movements. The arms may comprise a bronze bearing material constructed and arranged to reduce frictional resistance occurring between them and the cam plates during rotation of the turret. It should be further noted that cam track 809 is arranged substantially circular, except for a short distance (approximately four inches in actual application) on each side of the tangent point occurring between the turret and bowl 402. The ideal path for the clamping head as it approaches the substantially completed package for pick up purposes is one wherein clamping members 835 and 837 thereof resectively pass above and below the package and in parallel relationship therewith.

After the clamping head is in position to pick up the package, the head follows for a short distance (approximately eight inches) substantially parallel to the curved path of the carton to facilitate the clamping function, i.e. to permit cage plates 411 and 412 to open to release the carton therefrom. The clamping head then resumes its circular path about the vertical axis of column 802. In order to avoid excessively high accelerations of the clamping head, the clamping head approaches the package in a non-parallel manner. Also, the head deviates from a true circular path by minor amounts throughout the rest of its travel. At the point of package discharge, the head is pulled inboard to afford a clearance between it and the discharged package.

Pivot pin 838 of clamping member 837 is located so that member 837 clamps down on glue flap $B_5$ of the package when an upward force is applied to roller 841 by a cam 846. Spherical rollers 841 and 843 are maintained in rolling contact with opposite sides of the cam during the clamping head's travel. Clamping cam 846 may comprise maple wood or other suitable material exhibiting a high degree of strength, a low coefficient of friction, and a high resistance to abrasion. Other materials, such as "Nylatron," could also be utilized therefor. Cam 846 is suitably secured to stationary column 802 via a thin, flexible plate 847. Suitable cam flexure will aid in preventing vertical loading of the clamping head due to possible misalignment of the clamping arms.

The integrated drive train for the above described assemblies is schematically illustrated in FIG. 28. A main, variable speed electric drive motor 900 is suitably arranged to selectively drive an output shaft 901 by control means, not shown. The shaft has a first pulley 902 suitably keyed thereto which in turn drives a plurality of endless belts 903 and a second pulley 904. The second pulley is keyed to an output shaft 905, having a spur gear 906 secured to the top end thereof arranged to mesh with bull or ring gear 405 attached to bowl 402 (FIG. 2). It will be seen that gear 405 provides the power input to the assemblies hereinafter described. The main drive motor and attendant operative connections to gear 405 may be positioned at any convenient location about bowl 402. In one application, rotation of the bowl at 18.75 r.p.m. effected an output of three hundred completed packages or carriers per minute.

Gear 405 is arranged to drive ring gear 201 to rotate housing 203 of carton assembly turret 200 (FIG. 11) at a preselected speed, in accordance with standard gear design considerations. Gear 201 meshes with a gear 135 keyed to haft 129 of inserter assembly turret 127. A pulley 136 may be attached to shaft 129 to drive a belt 137 arranged to rotate pulley 116 and shaft 117 of the above described clip feeder. Referring to the drive mechanisms for first can infeed assembly 500, gear 405 drives a pinion gear 550, secured to a shaft 551. The shaft is arranged to drive a timing belt pulley 552 and an endless belt 553, constituting the drive input to the can infeed assembly. In particular, the belt is arranged to drive a timing belt pulley 554 mounted on a shaft 555 operatively connected to a plurality of intermeshing gears (not shown) contained in a gear box 556 (FIG. 29).

A timing belt pulley 557 is secured to the upper end of rotatable shaft 555 and drives an endless belt 558. The belt drives timing belt pulley 534 to impart rotation to shaft 530 of above-described no-carton-no-can assembly 514. Shaft 555 further drives intermeshing bevel gears (not shown) contained in a gear box 560 which in turn drive a rotatable shaft 561 having a pulley 562 mounted thereon. Pulley 562 drives an endless belt 563 and a spaced pulley 564 mounted on a shaft 565. The shaft drives pulleys 566 and 567 mounted thereon. Pulley 566 drives a pulley 568 and shaft 569 via an endless belt 570. Shaft 569 mounts a sprocket 571 arranged to drive block chain 504, further mounted on idler sprocket 572, for can infeed purposes. Pulley 567 is arranged along with idler pulleys 573, 574 and 575 to drive a cable 576 for purposes above described. An adjustable idler pulley 577 may be arranged in the manner illustrated (FIG. 28) to place the cable under the desired tension.

Shaft 511 is arranged to project out of gear box 556 to drive pulley 509 and lugged belt 508 (FIG. 22). A third shaft 578 is also operatively connected to the gear box and to a bevel gear connection 579 to drive shaft 540 of infeed screw 515. From the above, brief description it can be seen that rotation of bowl 402 via drive motor 900 will function to drive can infeed chain 504, lugged belt 513, device 514, cable 576 and infeed screws 515 and 543 in synchronized relationship with respect to each other. The drive means for second can infeed assembly 600 is substantially identical to that above-described. It should be understood that the various gear ratios and other design parameters can be determined by one skilled in the art to afford the various mechanisms their desired synchronized speeds.

The drive connection to gluer 707 comprises a pinion gear 710 arranged to mesh with bull gear 405 to rotate a shaft 711 conected thereto at a ratio approximately 16:1, for example. Shaft 711 drives a sprocket 712 which in turn drives an endless chain 713 suitably mounted on a second sprocket 714. Sprocket 714 is mounted on a shaft 715 which drives a shaft 716 through a suitably arranged mitre gear set 717 to impart the desired rotational speed to shaft 716. Shaft 716 carries a pulley 718 which in turn drives a chain 719. Chain 719 is trained over a pulley 720 which in turn drives shaft 721 which is operatively secured to gluer wheel 707 (FIGS. 25 and 28). As suggested above, the gluer is illustrated in a simplified form over the one used for actual package forming applications.

An overload release clutch (not shown) could be arranged to selectively disconnect shaft 711 and sprocket 712. The clutch may be utilized to automatically create such disconnection by thermostat control means (not shown) when the temperature of the glue used by gluer 707 falls below a specified minimum. Such arrangement will prevent possible damage to the gluer should it attempt to dispense "cold" glue.

Referring now to the drive connections for the compression and discharge turret assembly 800, a gear 850 is arranged to mesh with bull gear 405 to drive a shaft 851 secured thereto. Shaft 851 further carries a sprocket 852 arranged to drive an endless chain 853. Chain 853 is suitably trained at its other end on ring gear 805 to drive bowl 801 of the compression and discharge turret (FIG. 26).

DESCRIPTION OF THE PREFERRED METHOD EMBODIMENT

The preferred method for folding and securing a multi-panneled blank around a plurality of objects is best described by reference to FIG. 3. Clip inserting means 100 is arranged for inserting at least one clip into a blank which is moved in a circular path on turret assembly 200. The next step comprises transferring and moving the blank in a circular path about the vertically disposed axis of turret 400. Each cage means 401 is arranged for maintaining panel $B_1$ in a plane arranged substantially parallel to such axis and for folding or pivoting panels $B_2$ and $B_3$ radially outwardly into pocket form.

Transferring means or infeed assembly 500 is then arranged for moving objects or cans C tangentially toward the circular path of the blank and at a linear speed approximating the tangential speed thereof. Similar steps may be accomplished by second transferring means 600 if so desired. As mentioned above, diverting means 514 (FIG. 1) may be utilized for selectively diverting the direction of movement of one or more objects during the transferring step.

Plow and gluing means 700 is constructed and arranged for substantially completely wrapping and securing the blank around the objects. The discharging step is effected by discharge means 800, arranged for clamping the carrier at glue flap $B_5$. The discharge means is further arranged for simultaneously moving the completed carrier into a circular path defined about a vertically disposed axis thereof.

It should be understood that a number of the above-described mechanisms could be utilized to perform various other functions. For example, cage means 401, arranged for receiving, holding and carrying at least one article thereby, could be modified slightly to cap the top of such article(s) with a "snap-on" plastic cover or carrier. Also, turret assembly 200 could be changed to adapt it for various die cutting, scoring, preforming (e.g., folding), coating and/or embossing operations. For example, such a scoring operation could be effected by a scoring roll (not shown) rotatably mounted adjacent to turret assembly 200. In such an event backup plates 210 (FIGS. 12 and 15) could have grooves suitably formed thereon to cooperate with adjacent ridges formed on the scoring roll(s) to impress the desired score configuration on the blank.

We claim:

1. In a packaging apparatus for folding a blank around a plurality of objects, a rotatably mounted turret, blank transferring means arranged adjacent to said turret for transferring said blank thereto, object transferring means aranged adjacent to said turret for transferring said objects thereto, folding means arranged on said turret for receiving said blank and objects and for folding said blank around said objects upon rotation of said turret and clip feeding means arranged adjacent to said blank transferring means for inserting object retaining clips into said blank prior to when said blank is transferred to said turret.

2. The invention of claim 1 further comprising plow and gluing means arranged adjacent to said turret for completely wrapping and securing said blank around said objects to form a carrier.

3. The invention of claim 2 further comprising discharge means arranged adjacent to said turret to cooperate with said folding means for receiving said carrier from said turret after it has been formed by said plow and gluing means.

4. The invention of claim 1 wherein said blank transfer means comprises a rotatably mounted turret.

5. The invention of claim 1 wherein said object transferring means comprises a rotatably mounted and elongated screw means arranged substantially tangentially with respect to the periphery of said turret, said screw means having pocket means formed therein to move said objects towards the periphery of said turret upon rotation of said screw means.

6. The invention of claim 1 wherein said folding means comprises an articulated cage assembly.

7. The invention of claim 6 wherein said folding means further comprises means for actuating said cage assembly to fold said blank into pocket form.

8. In a packaging apparatus, a package assembly turret mounted for rotation about a vertically disposed axis, at least one cage means mounted on said turret to form a work holder upon rotation of said package assembly turret, object transferring means arranged adjacent to said package assembly turret for transferring a plurality of objects to said cage means, said cage means positioned to hold said objects therein, and diverting means arranged adjacent to said object transferring means for selectively diverting objects out of said transferring means prior to when such objects are transferred to said cage means.

9. The invention of claim 8 wherein said cage means comprises articulated plates and means for pivoting at least one of said plates upon rotation of said package assembly turret.

10. The invention of claim 9 wherein said plates comprise a vertically disposed first plate attached to said package assembly turret and second and third plates pivotally mounted at opposite edges of said first plate.

11. The invention of claim 8 further comprises blank transferring means rotatably mounted adjacent to said package assembly turret for feeding a blank to said cage means.

12. The invention of claim 8 wherein said object transferring means comprises an endless belt having pockets formed therein arranged to engage said objects and transfer them toward said package assembly turret.

13. The invention of claim 8 further comprising means for rotating said turret at a predetermined tangential speed and wherein said object transferring means comprises screw means arranged to feed said objects to said cage means at approximately the tangential speed of said package assembly turret.

14. The invention of claim 13 wherein said screw means is arranged substantially tangentially with respect to the periphery of said package assembly turret.

15. The invention of claim 8 further comprising plow and gluing means arranged adjacent to said package assembly turret for completely wrapping and securing a blank around a plurality of objects to form a carrier.

16. The invention of claim 8 further comprising discharge means rotatably mounted adjacent to said package assembly turret to cooperate with said cage means for receiving said objects therefrom, said package assembly turret further comprising means for substantially releasing said objects from said cage means when they are received by said discharge means.

17. The invention of claim 16 wherein said discharge means comprises a turret mounted for rotation about a second vertically disposed axis and at least one clamping means pivotally arranged on said turret for vertical movements in the direction of said second vertically disposed axis.

18. The invention of claim 17 further comprising means operatively associated with said clamping means for moving said clamping means radially outwardly relative to said second vertically disposed axis.

19. In a packaging apparatus, a package assembly turret mounted for rotation about a vertically disposed axis, at least one cage means mounted on said turret to form a work holder upon rotation of said package assembly turret, object transferring means arranged adjacent to said package assembly turret for transferring a plurality of objects to said cage means, said cage means positioned to hold said objects therein, discharge means rotatably mounted adjacent to said package assembly turret to cooperate with said cage means for receiving said objects therefrom, said package assembly turret further comprising means for substantially releasing said objects from said cage means when they are received by said discharge means, said discharge means comprising a turret mounted for rotation about a second vertically disposed axis and at least one clamping means pivotally arranged thereon for vertical movements in the direction of said second vertically disposed axis.

References Cited
UNITED STATES PATENTS

| | | | |
|---|---|---|---|
| 952,256 | 3/1910 | Jacobsen | 53—234 |
| 2,897,643 | 8/1959 | Byrd | 53—281X |
| 3,032,945 | 5/1962 | Currie et al. | 53—48 |
| 3,303,631 | 2/1967 | Ganz | 53—48 |

FOREIGN PATENTS

| | | | |
|---|---|---|---|
| 1,032,677 | 6/1966 | Great Britain | 53—194 |

THERON E. CONDON, Primary Examiner

R. L. SPRUILL, Assistant Examiner

U.S. Cl. X.R.

53—63, 128, 183, 383